(12) United States Patent
Kanatsu et al.

(10) Patent No.: US 7,317,835 B2
(45) Date of Patent: Jan. 8, 2008

(54) IMAGE PROCESSING METHOD AND APPARATUS

(75) Inventors: Tomotoshi Kanatsu, Tokyo (JP); Yukari Toda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 638 days.

(21) Appl. No.: 10/627,644

(22) Filed: Jul. 28, 2003

(65) Prior Publication Data

US 2004/0096121 A1 May 20, 2004

(30) Foreign Application Priority Data

Jul. 31, 2002 (JP) ............................. 2002-223576

(51) Int. Cl.
*G06K 9/46* (2006.01)
(52) U.S. Cl. .................................................. 382/190
(58) Field of Classification Search .................. None
See application file for complete search history.

(56) References Cited

U.S. PATENT DOCUMENTS

| | | | | |
|---|---|---|---|---|
| 4,903,312 A | * | 2/1990 | Sato | 382/170 |
| 6,011,866 A | * | 1/2000 | Donelly et al. | 382/216 |
| 6,014,470 A | * | 1/2000 | Matsuda | 382/275 |
| 6,041,205 A | | 3/2000 | Funada et al. | 399/196 |
| 6,563,949 B1 | * | 5/2003 | Takebe | 382/190 |
| 2004/0161151 A1 | * | 8/2004 | Iwayama et al. | 382/187 |

FOREIGN PATENT DOCUMENTS

| | | |
|---|---|---|
| JP | 8-153199 | 6/1996 |
| JP | 10-164354 | 6/1998 |
| JP | 11-27545 | 1/1999 |
| JP | 11-213149 | 8/1999 |
| JP | 2001-184511 | 7/2001 |
| JP | 2002-142101 | 5/2002 |

\* cited by examiner

*Primary Examiner*—Matthew C. Bella
*Assistant Examiner*—Alex Liew
(74) *Attorney, Agent, or Firm*—Fitzpatrick, Cella, Harper & Scinto

(57) ABSTRACT

An image processing method and apparatus which efficiently detect an image input direction, from an image with much differential information to an image with little differential information. The direction of an image including a character area, inputted into a computer, is detected. First, a binary image of the input image is generated, and a tile image is generated by adding a predetermined value to respective tiles, each tile corresponding to a predetermined size area in the binary image. Next, an area of the binary image, corresponding to an area within a circumscribed rectangle surrounding connected pixels having the same value in the tile image, is extracted as a character area. Then, the direction of characters included in the character area is recognized and thereby the direction of the input image is detected.

3 Claims, 39 Drawing Sheets

FIG. 4

NAS 2001

The Front Line of the Internet

PREVIEW OF NAS 2001

"NAS 2001" will be held on Japan Convention Center in Chiba. The exhibition displays hardware, software and services of network business.

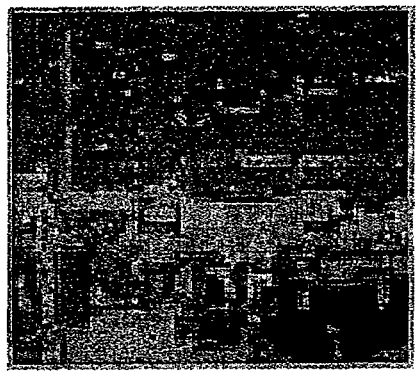

IT Zone
Data warehouse, ERP, groupware, map information system, netowork administration tools. The highlight is B2B enterprize zone.

Web Zone
Miscellaneous web servers. Application service providers, Content creation software.

Network Zone
LAN/WAN router hub/ network softeare mobile computer, FAX server, Gateway, Firewall and virusscan are displayed.

PC Zone
New machines of saved space desktop computer NSC2991. Handheld optical character recognizer YOM21. Super server N10000 can proceed 20GT transactions per second.

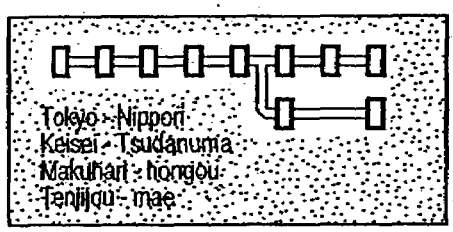

322 The CompiNet magazine Jan. 2001

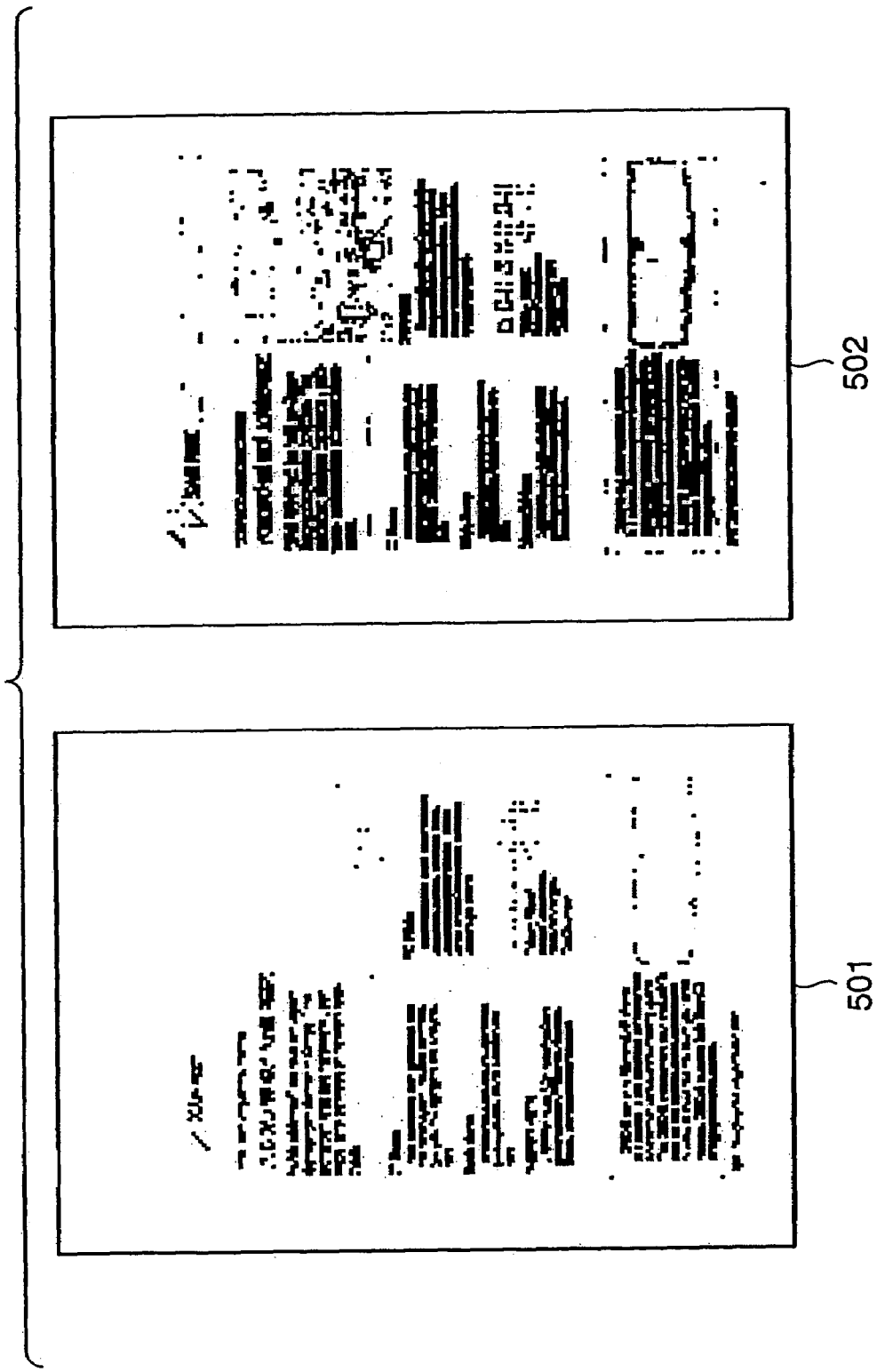

FIG. 7

NAS 2001 703

The Front Line of the Internet

PREVIEW OF NAS 2001 702

"NAS 2001" will be held on Japan Convention Center in Chiba. The exhibition displays hardware, software and services of network business.

IT Zone
  Data warehouse, ERP, groupware, map information system, netowork administration tools. The highlight is B2B enterprize zone.

Web Zone
  Miscellaneous web servers. Application service providers, Content creation software.

Network Zone
  LAN/WAN router hub/ network softeare mobile computer, FAX server, Gateway, Firewall and virusscan are displayed.

PC Zone
  New machines of saved space desktop computer NSC2991. Handheld optical character recognizer YOM21. Super server N10000 can proceed 20GT transactions per second.

701

DX2049 can print 25(mono), 22 sheets in 1 minute. It can compress the image data smaller than others without lossing quality. The DX2049 management your productivity with PC and network-based environment. In order to maximize the role in your office network, DX2049 supports both MachIDE and gorgeousSCSI drivers.

322 The CompiNet magazine Jan. 2001

FIG. 8

DX2049 can print 26(mono), 22 sheets in 1 minute. It can compress the image data smaller than others without lossing quality. The DX2049 management your productivity with PC and network-based environment. In order to maximize the role in your office network, DX2049 supports both MachIDE and gorgeousSCSI drivers.

FIG. 9

"NAS 2001" will be held on Japan Convention Center in Chiba. The exhibition displays hardware, software and services of network business.

FIG. 10

NAS 2001

DX2049 can print 26(mono), 22 sheets in 1 minute. It can compress the image data smaller than others without lossing quality. The DX2049 management your productivity with PC and network-based environment. In order to maximize the role in your office network, DX2049 supports both MachIDE and gorgeousSCSI drivers.

DX2049 can print 26(mono), 22 sheets in 1 minute. It can compress the image data smaller than others without lossing quality. The DX2049 management your productivity with PC and network-based environment. In order to maximize the role in your office network, DX2049 supports both MachIDE and gorgeousSCSI drivers.

"NAS 2001" will be held on Japan Convention Center in Chiba. The exhibition displays hardware, software and services of network business.

FIG. 14

NAS 2001  RD3

FIG. 15

NAS 2001

FIG. 21

PREVIEW OF NAS 2

NAS 2001" will be held on Japa
Convention Center in Chiba. Th

Tokyo - Nippori
Keisei - Tsudanuma
Makuhari - hongou
Tenjijou - mae

FIG. 23

PREVIEW OF NAS 2
NAS 2001" will be held on Japa
Convention Center in Chiba. The

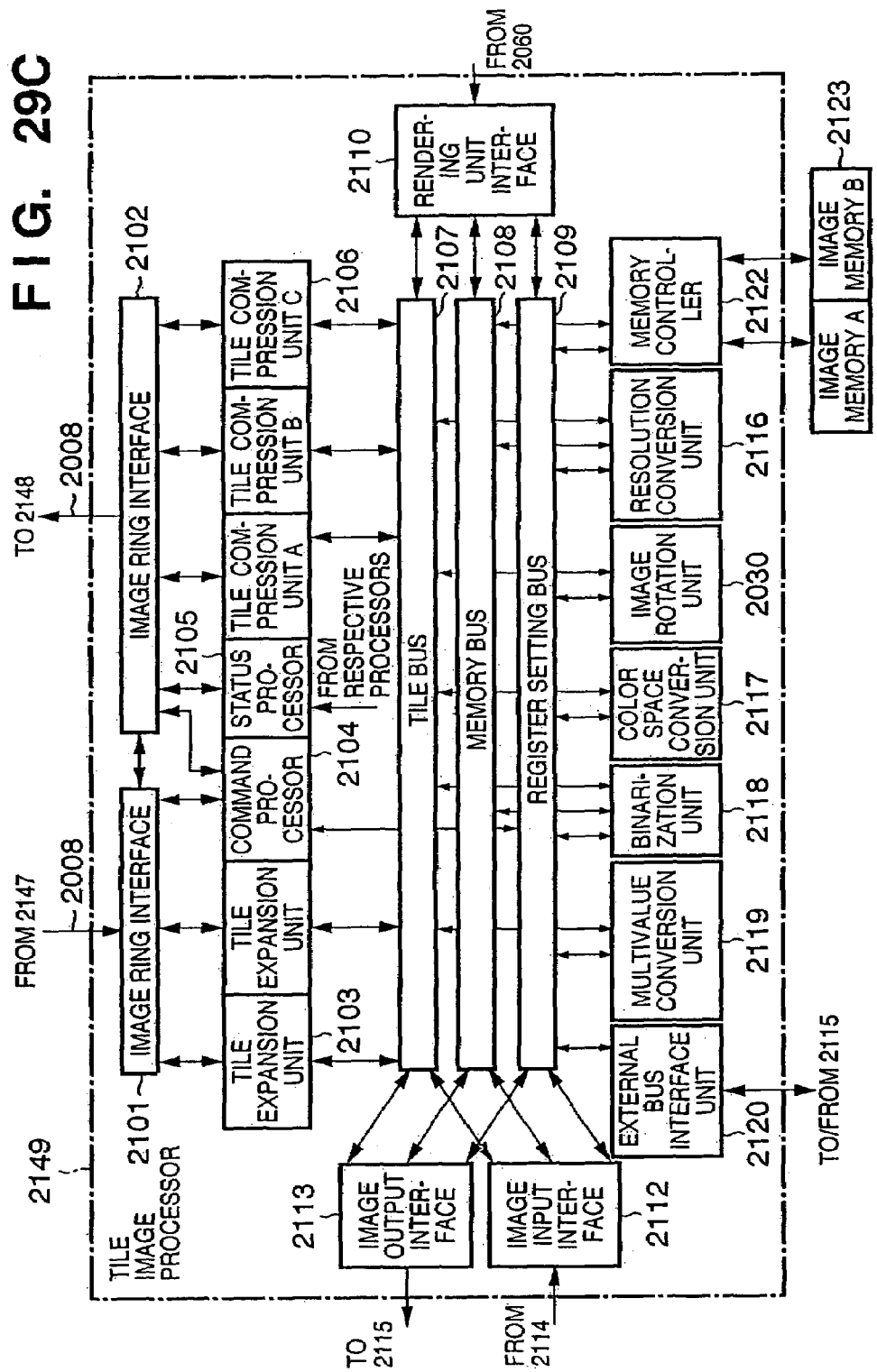

FIG. 34

JHS Okinawa Campaign.

Optimum for cellular phones or as a 500ml (PET) bottle holder! JHS' specially made non-leaking "puringu bag" is included.

A leisurely start, before and after overnight-stay plans.

October 2000 ~ February 2001

Enjoy your tour in charm and comfort at a reasonable price.

Train fares from Haneda Airport to Tokyo station discounted by 50%.

Turn in the Giveaway Form to apply now!

FIG. 35

— 1064 A leisurely start, before and after overnight-stay plans.

1065 — October 2000 ~ February 2001 Enjoy your tour in charm and comfort at a reasonable price.

 — 1068

1066 — Train fares from Haneda Airport to Tokyo station discounted by 50%.

1062 — JHS Okinawa Campaign.

1061 — Optimum for cellular phones or as a 500ml (PET) bottle holder! JHS' specially made non-leaking "puringu bag" is included.

1067 —

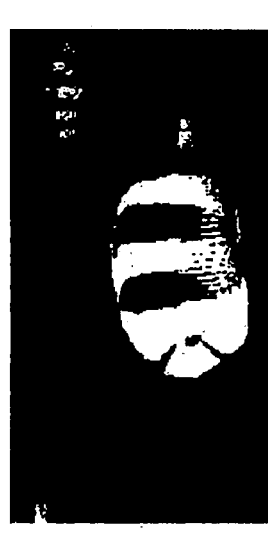
Turn in the Giveaway Form to apply now! — 1063

IMAGE PROCESSING METHOD AND APPARATUS

FIELD OF THE INVENTION

The present invention relates to image processing method and apparatus for detecting the direction (upward/downward/leftward/rightward) of an original image inputted using a scanner or the like.

BACKGROUND OF THE INVENTION

Conventionally, the direction of an original image inputted into a computer using a scanner or the like is detected by the following methods:

(1) Detection of Original Image Direction by Software

FIG. 30 shows the outline of software processing for detecting the direction of an image. As shown in FIG. 30, first, a color image 1011 as the object of direction detection is binarized by a binarization processing procedure 1012, and a binary image 1013 is generated. Next, the binary image 1013 is area-divided by an area division processing procedure 1014, and character coordinate information 1015 as coordinate information of a character area is generated. Then, the binary image 1013 in the character coordinate information 1015 is referred to by an OCR processing procedure 1016 thus character recognition processing is performed, and the result of direction detection of the color image 1011 is outputted.

The above processing will be described in more detail. FIG. 31 shows an example of the respectively 8-bit RGB color image 1011. This color image is simply binarized with a fixed threshold value 128 by luminance conversion. FIG. 32 shows an example of the binary image simply binarized from the color image in FIG. 31. As the binary image in FIG. 32 obtained by simple binarization includes a large amount of noise, excellent area division cannot be performed.

Accordingly, in the binarization processing procedure 1012, a histogram of luminance information of the color image is created as shown in FIG. 33, and an optimum binarization point 1041 is calculated. FIG. 33 shows the luminance information of the color image in FIG. 31 and the optimum binarization point 1041. Further, FIG. 34 shows a binary image from the color image 1011 using the binarization point 1041. As shown in FIG. 34, as a threshold value using the histogram of luminance information (binarization point 1041) is used in place of the fixed threshold value, the amount of noise included in the binary image in FIG. 34 is smaller in comparison with the binary image in FIG. 32, and excellent area division can be performed.

FIG. 35 shows an example of the result of area division performed on the binary image in FIG. 34 by the area division processing procedure 1014. In the area division processing, the resolution is reduced so as to connect black pixels, then edge line tracing is performed, and it is determined whether or not the traced profile is a character from the shape of the profile. In FIG. 35, rectangular areas 1061 to 1068 are determined as character areas. Note that areas 1067 and 1068 are erroneously determined areas.

As described above, in the OCR processing procedure 1016, the areas determined as the character areas are read and character-cutting processing is performed, and direction detection processing is performed on each character. In the direction detection processing, a feature vector of 1 character is calculated, and the feature vector is rotated and character recognition processing in 4 (0°, 90°, 180° and 270°) directions. From the results of character recognition in the 4 directions, one direction with the highest accuracy is determined as the result of direction detection.

In image direction detection by software processing, a value obtained by addition of OCR results of all the characters existing the original (characters existing in the character areas resulted from the area division), is outputted as the final result.

(2) Detection of Original Image Direction by Hardware

Next, the outline of hardware construction for the conventional image direction detection processing will be described. FIG. 36 is a block diagram showing the hardware construction of a specialized direction detection board connected to a main board of a monochrome digital copier. In FIG. 36, numeral 1071 denotes a character extraction unit having a specialized GA for character extraction processing and binarization processing; 1072, a RAM; 1073, a CPU; and 1074, a ROM.

FIG. 37 is a timing chart showing respective operations using the direction detection board in FIG. 36. Next, the operations of the direction detection board in FIG. 36 will be described with reference to the timing chart of FIG. 37.

In FIG. 37, "0" to "3" are page numbers of original images placed on an ADF (Automatic Direction Finder) of the monochrome digital copier. Further, numeral 1081 indicates timing of original reading by a scanner of the copier; 1082, timing of the character extraction processing and the binarization processing by the specialized character extraction GA; 1083, timing of direction determination OCR by the CPU; and 1084, timing of outputting the result of direction determination. As shown in FIG. 37, the results of processing of the respective pages are outputted by 2-pipeline delay from input of original.

First, the scanner sequentially reads the originals placed on the ADF, and VIDEO in FIG. 36 is generated. Note that VIDEO includes a CLK and image data (8 bits) synchronized with the CLK, a page signal indicating a page break of the image data, and a main-scanning synchronizing signal indicating a break of width of the image data.

The character extraction unit 1071 inputs the image data (8 bits), detects an area likely to be a character area including continuous image data (more specifically, refers to adjacent plural pixels, and detects an area where the difference between a maximum and minimum value is greater than a threshold value) and generates coordinate data thereof. Further, the character extraction unit 1071 binarizes the image data (8 bits). Note that a threshold value used in the binarization is determined from a histogram of a previous line. Then, the coordinate data and the binary image are written into the RAM 1072 (Note that the GA may have a RAM for storing the data). The above operation is performed at the timing indicated with the numeral 1082 in FIG. 37.

Next, the CPU 1073 performs the direction determination OCR processing in parallel to the character extraction processing on the next page. The CPU 1073 reads the coordinate data from the RAM 1072 in accordance with a program stored in the ROM 1074, and performs the direction determination OCR processing on the binary image on the RAM 1072 corresponding to the coordinate data. Note that in a case where the RAM has a sufficient size, the program on the ROM 1074 is downloaded to the RAM 1072 for increasing the processing speed. The character extraction in synchronization with the CLK is fixed time processing, however, as the direction determination OCR is time-variable processing, the OCR processing is forcibly terminated by utilizing a timer. The results of direction detection within a limited period by the timer (0, 90, 180, 270 and UNKNOWN) are outputted at timing indicated with "Δ" at the timing 1084.

However, the above-described conventional methods have the following problems.

(1) Problems in Detection of Original Image Direction by Software (1-1) Much Processing Time is Required.

Hereinbelow, described is a result of measurement of an A4 size image processed by a personal computer having a 266 MHz Pentium (registered trademark) II. First, it takes 1.8 seconds to create a histogram and an calculate an optimum binarization point. Next, it takes 0.3 to 1.0 seconds to perform the area division processing, although the time of the processing varies in accordance with image (depending on the number of connected black pixels). Then it takes 2 to 3 seconds to perform the OCR processing on the document original mainly including characters, although the time of the processing varies in accordance with the number of characters. Accordingly, total 4 to 5 seconds are required.

(1-2) A large Amount of Work Memory is Required.

As the entire color image is referred to so as to obtain an optimum binary image, in case of A4 size image, a 24 MBytes memory is required.

(2) Problems in Detection of Original Image Direction by Hardware (2-1) Cost is High.

As the specialized board is utilized and the CPU, the RAM, the ROM, the character extraction GA, a control GA (not shown) and the like are necessary only for the direction determination processing, the cost is high.

(2-2) Version Updating is Difficult

As the character extraction unit is comprised of a specialized GA, version updating of character extraction algorithm cannot be made without difficulty.

(3) Problem Common to Both Detection Methods

In both methods, it is impossible to perform the OCR processing on an inverted character portion. In recent years, color office documents are widely used as well as printed documents, and the color images often include more inverted character portions in comparison with monochrome originals. Accordingly, in both methods, the accuracy of recognition is low in color images having inverted character portions.

SUMMARY OF THE INVENTION

The present invention has been proposed to solve the conventional problems, and has its object to provide image processing method and apparatus which efficiently detect an image input direction of images, from an image having much differential information to an image having little differential information.

According to the present invention, the foregoing object is attained by providing an image processing method for detecting a direction of an image including a character area, inputted into a computer, the method comprising: a binary image generation step of generating a binary image of the image; a tile image generation step of generating a tile image by applying a predetermined value to tiles, each corresponding to a predetermined size area in the binary image; a character area extraction step of extracting an area in the binary image, corresponding to an area in a circumscribed rectangle surrounding connected pixels having the same value in the tile image, as a character area; and a direction detection step of recognizing a direction of characters included in the character area and thereby detecting the direction of the image.

Further, in the image processing method, at the binary image generation step, the binary image is generated with image area flags having a value 1 corresponding to a pixel equal to or greater than a predetermined value or a value 0 corresponding to a pixel less than the predetermined value, and at the tile image generation step, the tile image is generated with a tile having a value 1 where the number of image area flags having the value 1 is equal to or greater than a predetermined threshold value, and a tile having a value 0 where the number of image area flags having the value 1 is less than the predetermined threshold value.

Further, the image processing method, further comprises: a character extraction step of extracting the respective characters included in the character area extracted at the character area extraction step; and a character recognition step of recognizing a direction of the characters extracted at the character extraction step, and at the direction detection step, the direction of the character area is detected based on the result of recognition of the direction of the characters included in the character area.

Further, the image processing method further comprises: a determination step of determining whether or not the character area is an inverted image based on the binary image of the image; and an inversion processing step of inverting black and white components of the binary image if it is determined at the determination step that the character area is an inverted image.

Further, in the image processing method, at the tile image generation step, plural tile images are generated using plural different threshold values, and at the character area extraction step, the plural tile images are compared with each other and the character area included in the image is extracted.

Further, in the image processing method, the tile image is a low resolution binary image generated by counting the binary image, generated by differentiating the image, by a small area.

Further, in the image processing method, the tile image is a low resolution differential image generated by counting differential information of the image by a small area.

Further, in the image processing method, at the character area detection step, an area in the image, corresponding to the connected pixels extracted from the low resolution image, is extracted as a character area.

Further, in the image processing method, at the tile image generation step, plural low resolution images are generated using plural different threshold values.

Further, in the image processing method, at the character area extraction step, connected pixels extracted from the plural low resolution images are compared with the plural low resolution images and the character area is extracted.

Further, in the image processing method, at the character area extraction step, the low resolution image is divided into meshes, and the character area is extracted based on distribution of pixels within each mesh area.

Further, in the image processing method, the character area extraction step includes a selection output step of selectively outputting a character area extracted using connected pixels extracted from the low resolution image and a character area determined based on the distribution of pixels within each mesh area.

According to the present invention, as a character area can be detected utilizing plural low-resolution images comprised of differential information of a color image, an image input direction can be efficiently detected in images, from an image with much differential information to an image with little differential information.

Further, according to the present invention, as an inversion determination unit is provided, character recognition can be performed on an inverted character portion. Accordingly, even in a color image having many inverted character portions, the input direction can be detected.

Further, according to the present invention, as high-speed software processing can be performed with a small amount of work memory, the cost of parts upon version update of direction detection processing is unnecessary.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is an example of a color image used in the direction determination processing according to the first embodiment;

FIG. 5 is an example of an image as a result of tile header generation with threshold values T1=15 and T2=1 in a scanner image processor 2114;

FIG. 7 is an example of a processed result showing 3 rectangular areas finally extracted by primary character extraction processing;

FIG. 8 is an example of a read image from an area 701;

FIG. 9 is an example of a read image from an area 702;

FIG. 10 is an example of a read image from an area 703;

FIG. 11 is an example of the result of area division of a partial binary image determined as an inverted image by BS processing on the image read from the area 701 in FIG. 8;

FIG. 12 is an example of the result of general BSOCR processing on the inverted image resulted from pixel inversion processing on the area 701 in FIG. 8;

FIG. 13 is an example of the result of the area division of the partial binary image in FIG. 9;

FIG. 14 is an example of the result of the area division of the partial binary image in FIG. 10;

FIG. 15 is an example of an image inverted from the result of the area division of the partial binary image in FIG. 10;

FIG. 21 is an example of a read image (partial binary image) from an area 1902;

FIG. 23 is an example of the result of the area division of the partial binary image in FIG. 21;

FIG. 29C is a functional block diagram showing the details of a tile image processor 2149 in the controller unit 2000;

FIG. 34 is an example of the binary image from the color image 1011 using the binarization point 1041;

FIG. 35 is an example of the result of area division in a case where the binary image in FIG. 34 is subjected to area division by the area division processing procedure 1014;

DETAILED DESCRIPTION OF THE PREFERRED EMBODIMENTS

Hereinbelow, operations of image processing method and apparatus according to the present invention will be described in detail with reference to the drawings.

First Embodiment

Figure 1:
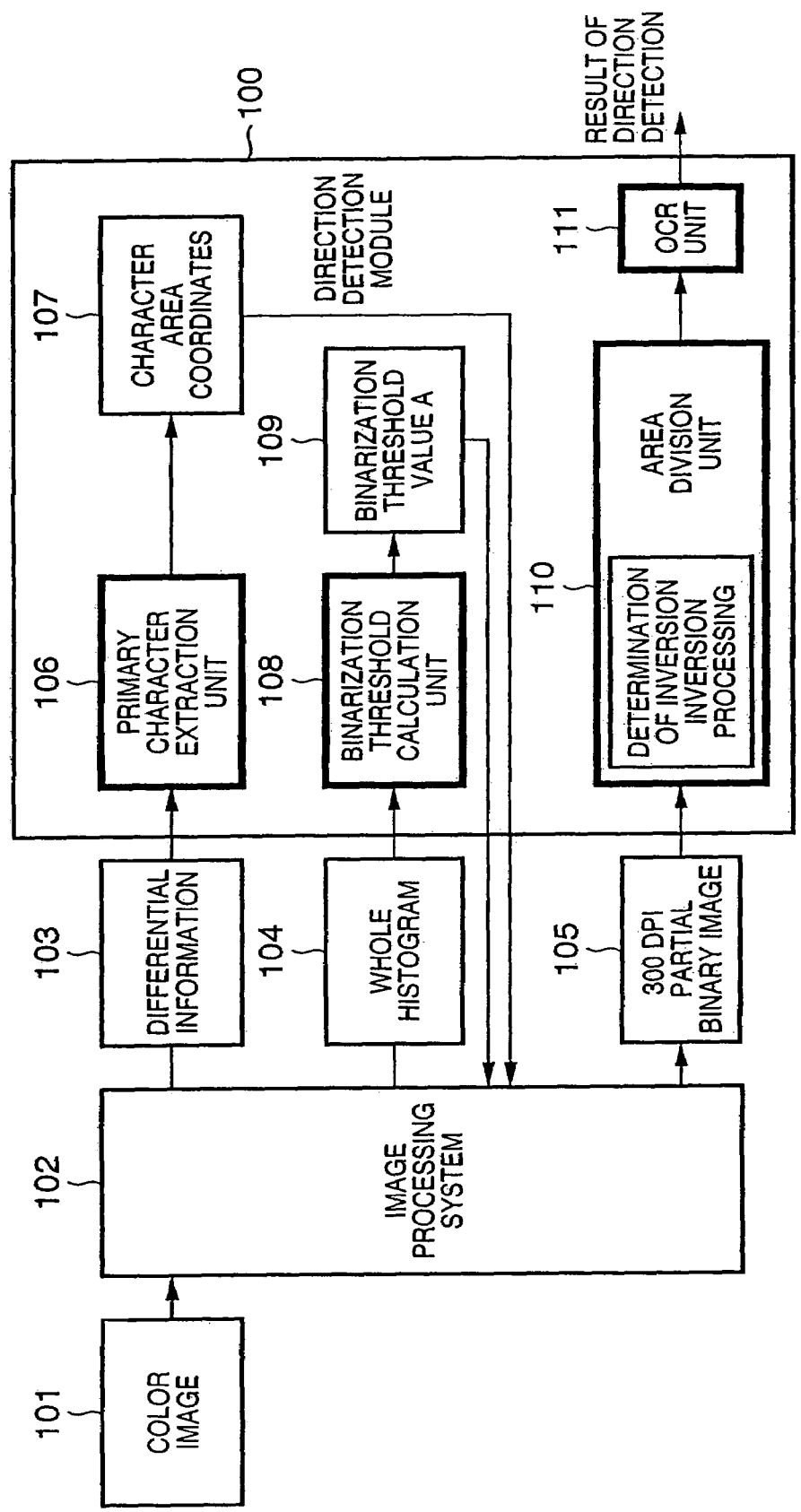
FIG. 1 is a block diagram showing the construction of an image processing apparatus according to a first embodiment of the present invention.

FIG. 1 is a block diagram showing the construction of an image processing apparatus according to a first embodiment of the present invention. In FIG. 1, numeral 101 denotes a color image as the object of direction determination; and 102, a general image processing system having a CPU, a RAM, a ROM and the like and having hardware functions to perform differential processing of input image, histogram operation, compression/decompression processing, resolution conversion, binarization processing and the like. Note that these functions may be performed by software processing in place of hardware.

Numeral 103 denotes differential information generated by the image processing system 102; 104, histogram information (whole histogram) generated by the image processing system 102; and 105, a binary image of character portion (1 area) of color image data generated by the image processing system 102.

The respective parts in a direction detection module 100 are realized by a processor included in the image processing system 102, however, it may be arranged such that they are realized as software functions, not as hardware functions, and performed using a CPU.

In FIG. 1, numeral 106 in the direction detection module 100 denotes a primary character extraction unit to input the differential information 103 and estimate a character area; 107, a character area coordinates generated by the primary character extraction unit 106; 108, a binarization threshold calculation unit to input the histogram information 104 and calculate an optimum binarization threshold value; and 109, a binarization threshold value calculated by the binarization threshold calculation unit 108.

Further, numeral 110 denotes an area division unit to input the binary image 105 of character portion and generate more detailed coordinates of the character area. The area division unit 110 has an inversion determination function and an inversion processing function. If it is determined that the partial binary image is an inverted area, the area division unit 110 performs inversion processing on the binary image and performs area division processing on the image. Numeral 111 denotes an OCR unit to perform direction determination OCR processing on the character area detected by the area division unit 110.

Next, as an example of the general image processing system 102, a digital color copier will be described with reference to FIGS. 29A to 29C.

Figure 29A:
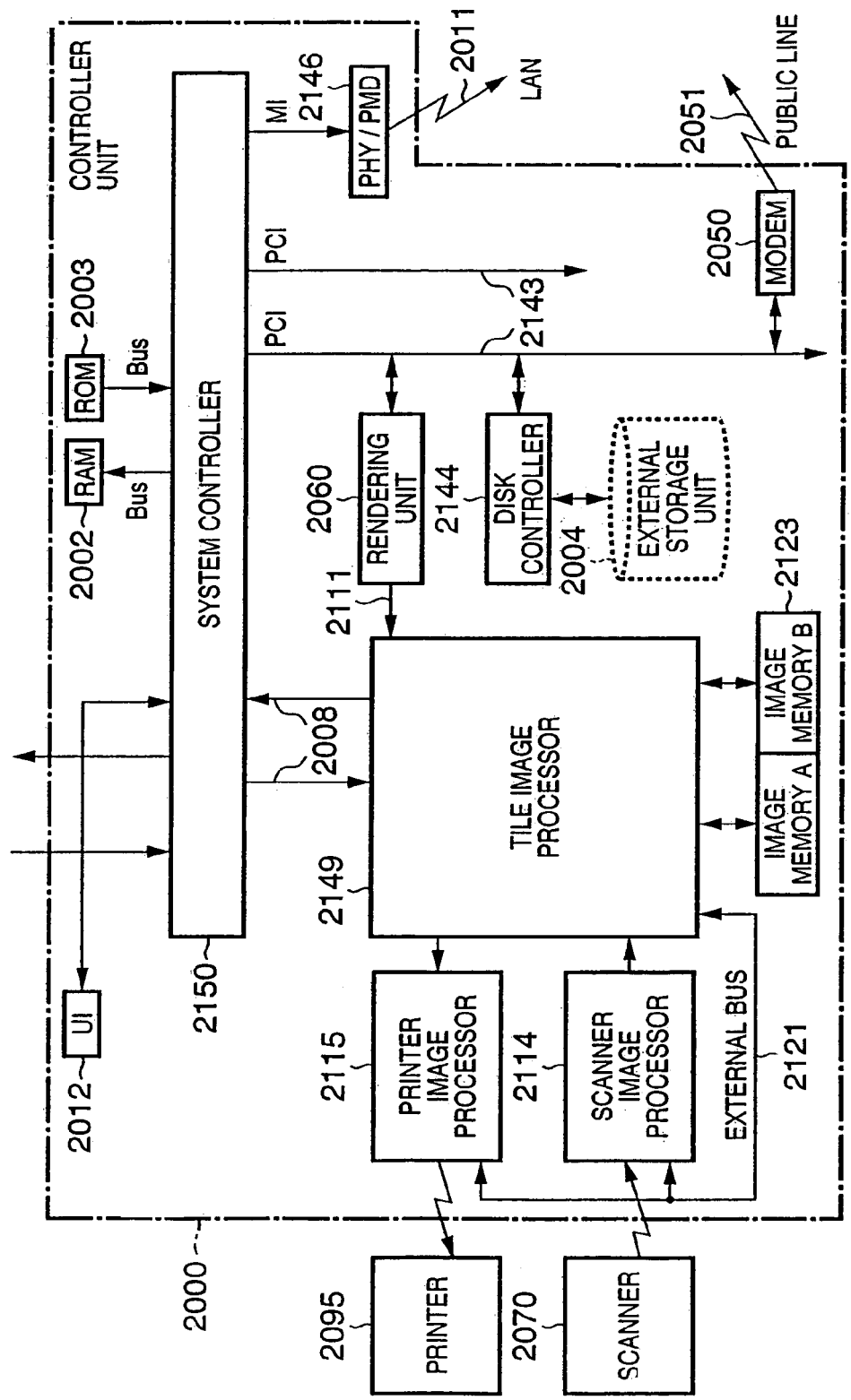
FIG. 29A is a functional block diagram showing the construction of a digital color copier according to an embodiment of the present invention.

FIG. 29A is a functional block diagram showing the construction of a digital color copier according to an embodiment of the present invention. In FIG. 1, a controller unit 2000 inputs/outputs image information and device information and performs image mapping of PDL data and the like. The controller unit 2000 is connected to a scanner 2070 as an image input device, a printer 2095 as an image output device, a LAN 2011 and a public line (WAN) 2051.

Figure 29B:
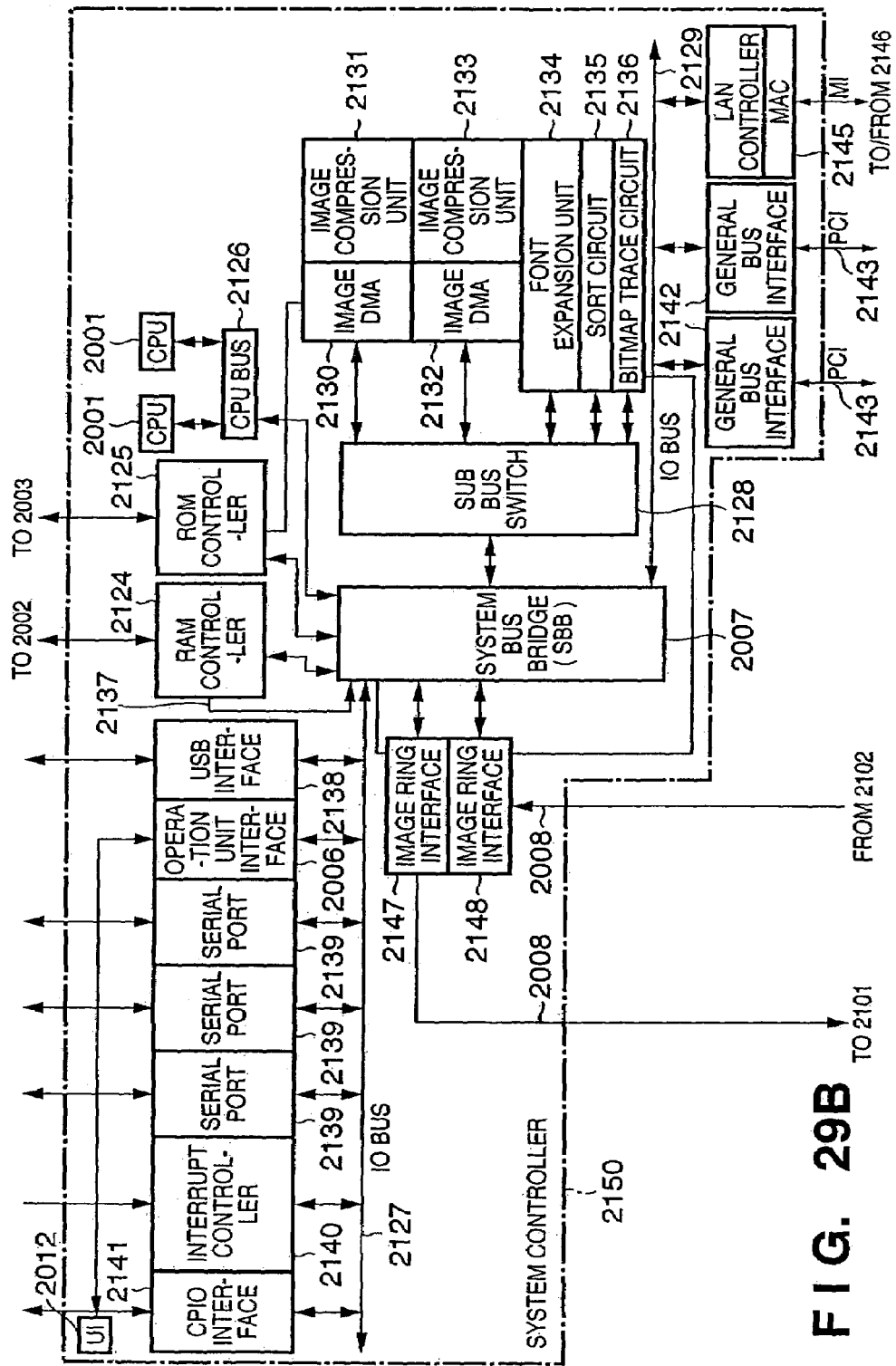
FIG. 29B is a functional block diagram showing the details of a system controller 2150 in a controller unit 2000.
Figure 30:
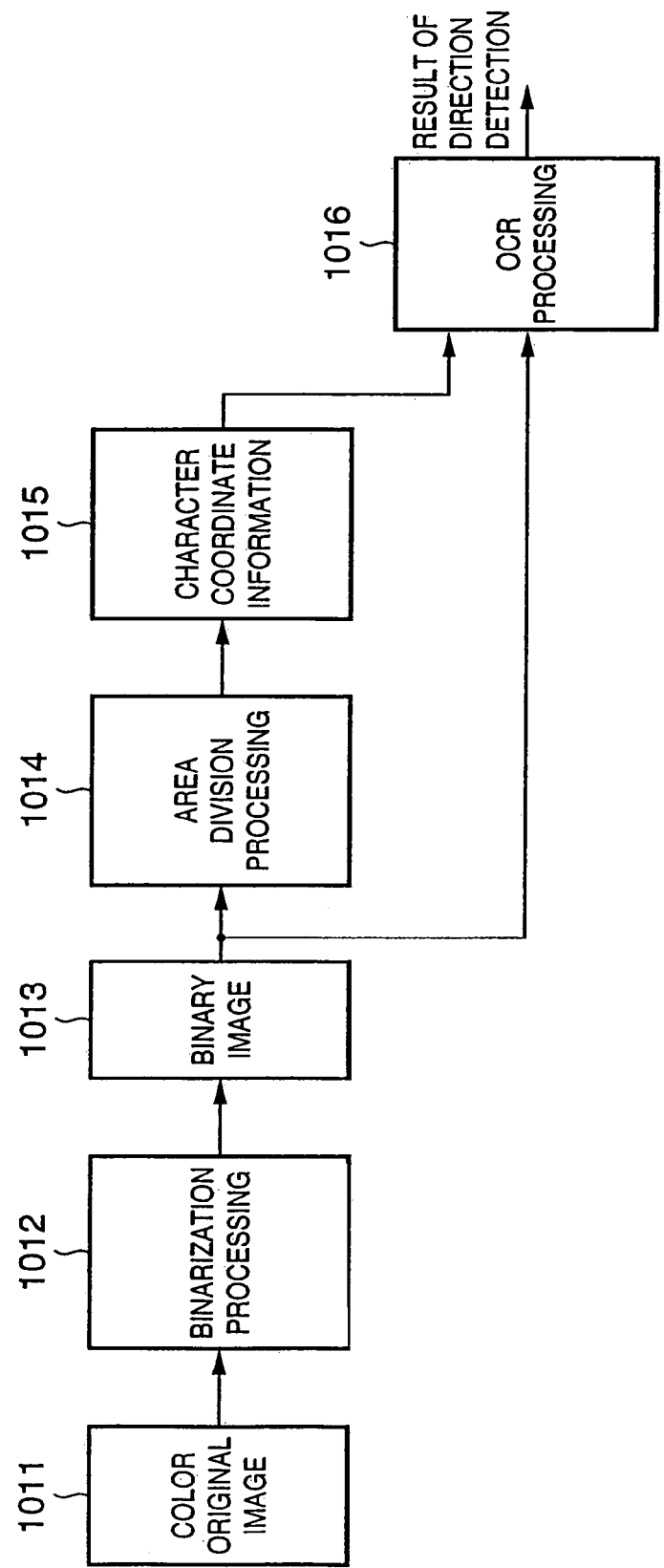
FIG. 30 is a block diagram showing the outline of the conventional software image direction detection processing.
Figure 31:
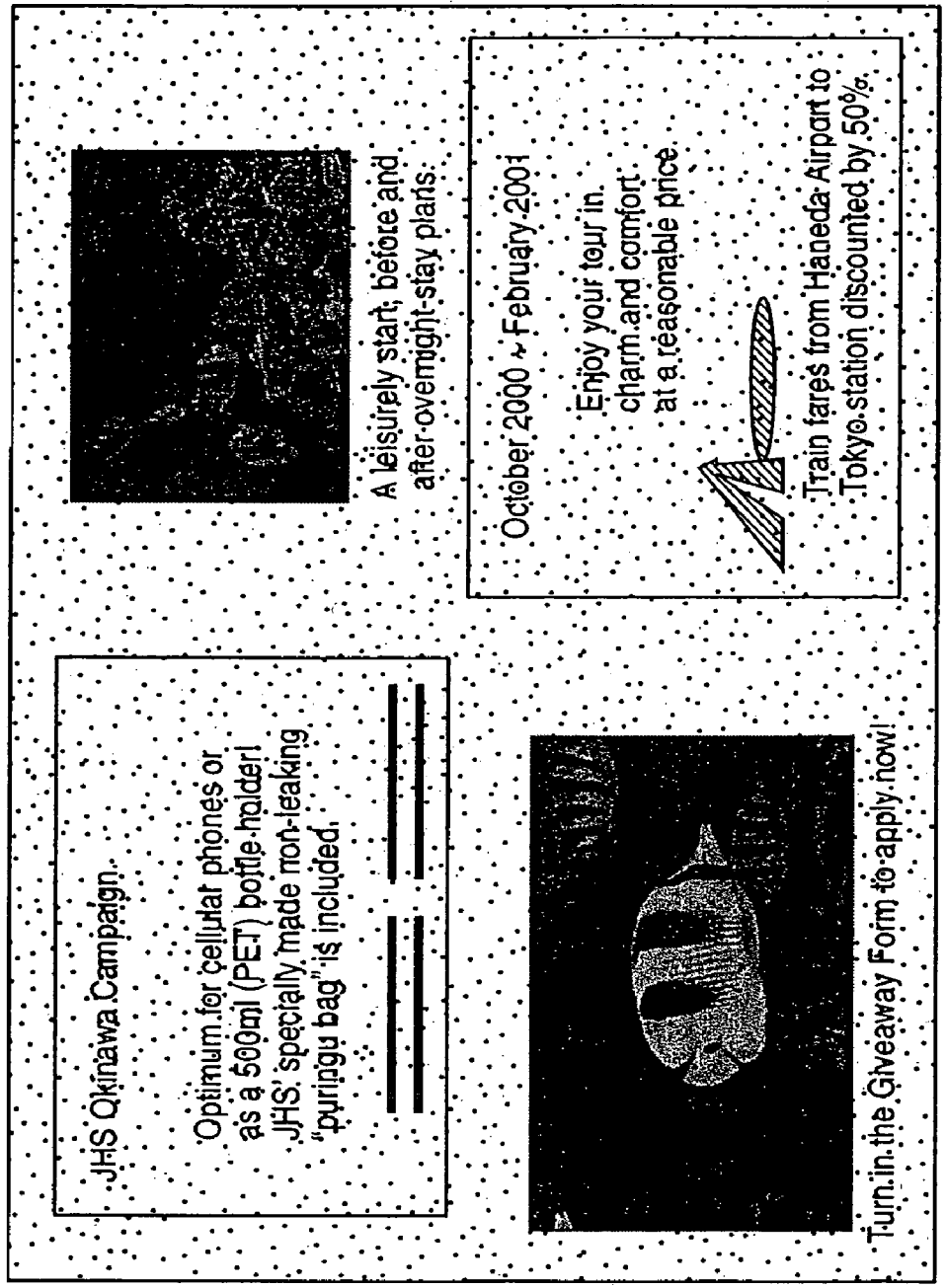
FIG. 31 is an example of the respectively 8-bit RGB color image 1011.
Figure 32:
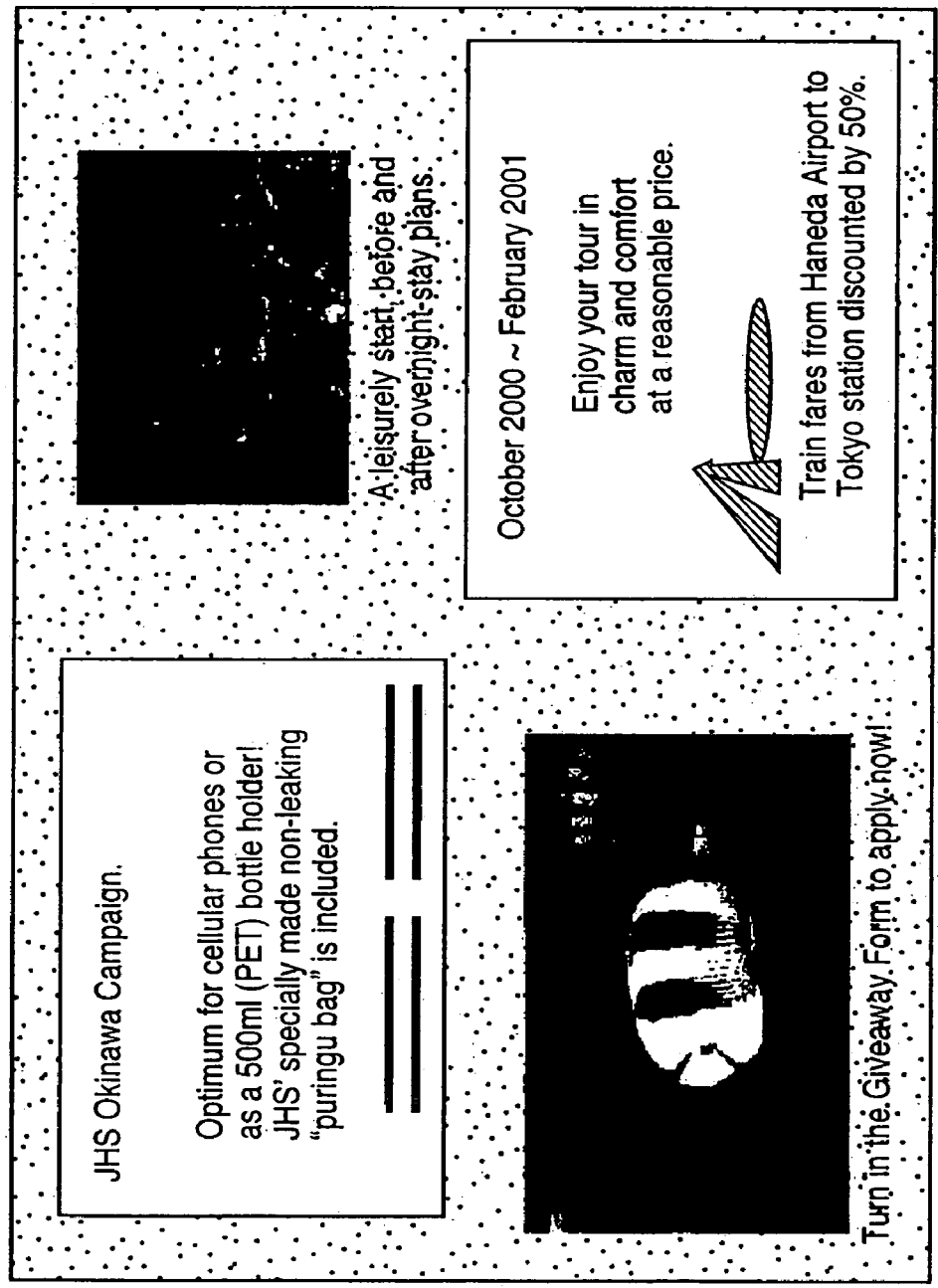
FIG. 32 is an example of the binary image simply binarized from the color image in FIG. 31.
Figure 33:
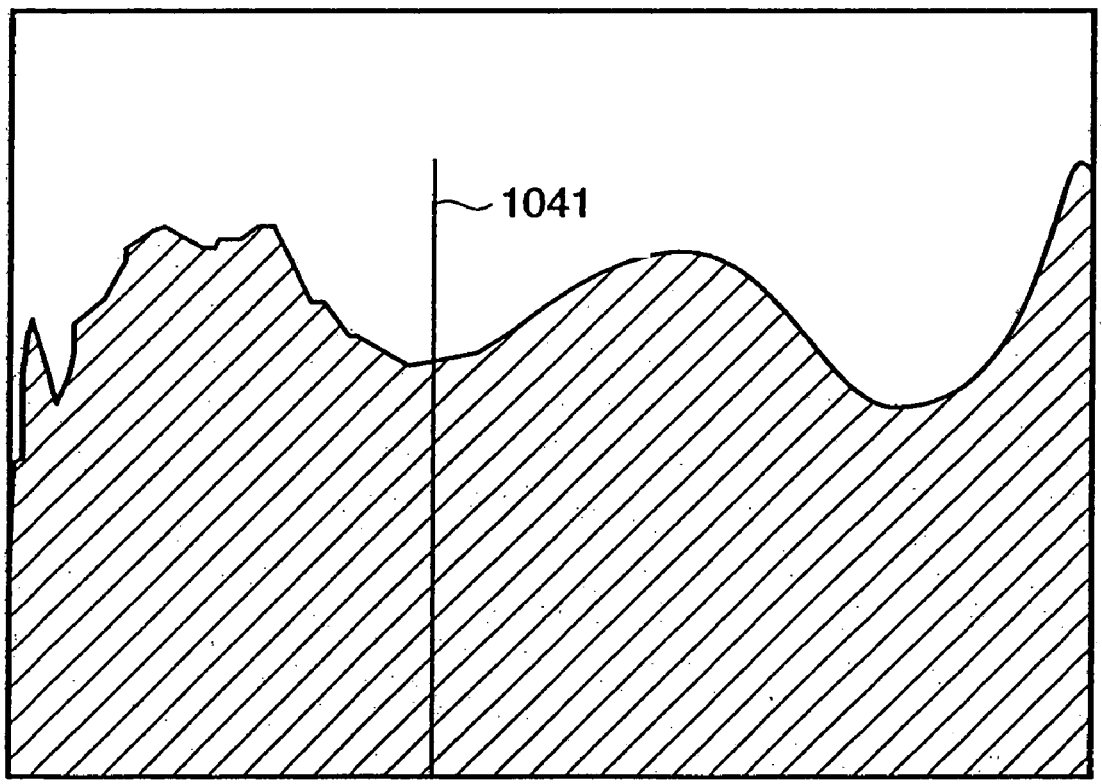
FIG. 33 is an example of the luminance histogram of the color image in FIG. 31 and the optimum binarization point 1041.
Figure 36:
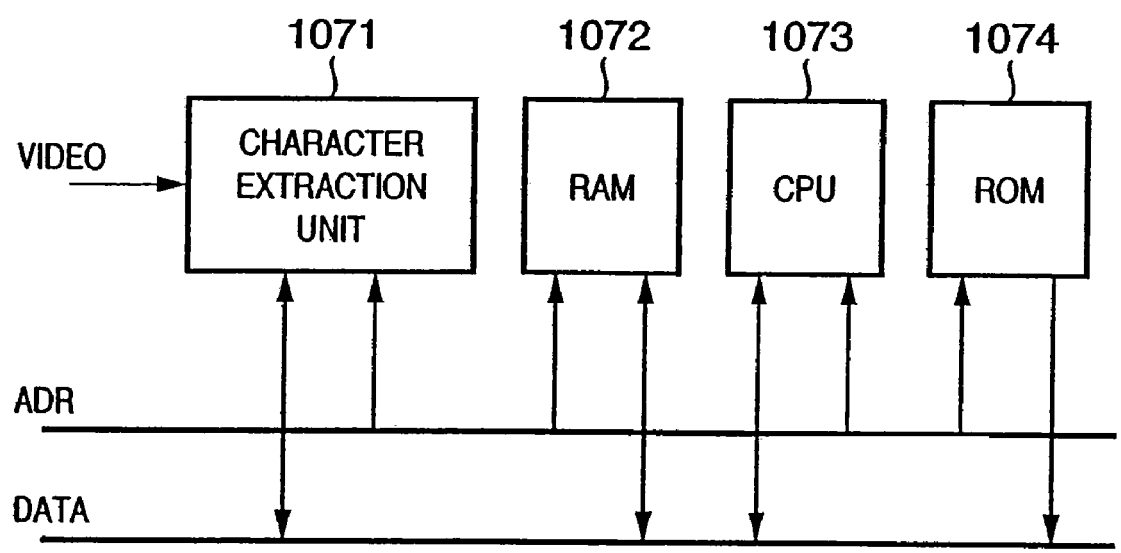
FIG. 36 is a block diagram showing the hardware construction of the specialized direction detection board connected to the main board of the monochrome digital copier.
Figure 37:
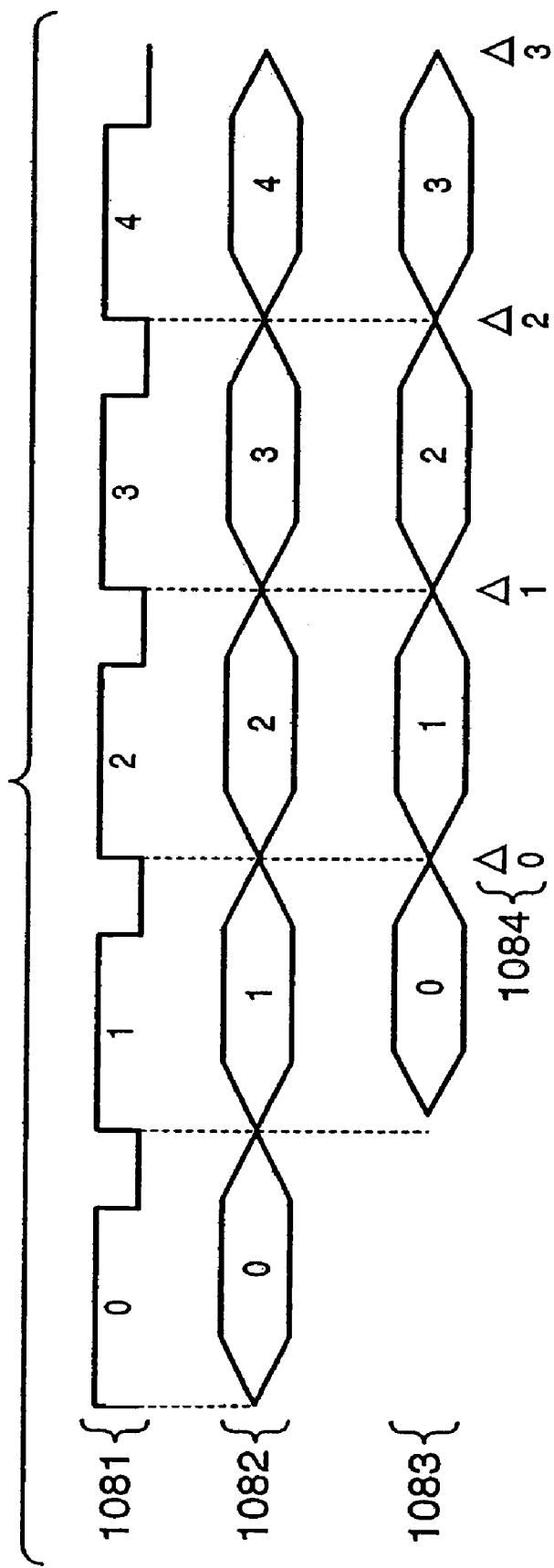
FIG. 37 is a timing chart showing the respective operations using the direction detection board in FIG. 36.

FIG. 29B is a functional block diagram showing the details of a system controller 2150 in the controller unit 2000. FIG. 29C is a functional block diagram showing the details of a tile image processor 2149 in the controller unit 2000.

In FIG. 29B, a CPU 2001 is a processor to control the overall digital color copier. Note that in the present embodiment, 2 CPUs are connected to a common CPU bus 2126 and further connected to a system bus bridge 2007.

The system bus bridge 2007 is a bus switch connected to the CPU bus 2126, a RAM controller 2124, a ROM controller 2125, an IO bus 2127, a sub bus switch 2128, an IO bus 2129, an image ring interface 2147 and an image ring interface 2148.

The sub bus switch 2128 is a second bus switch connected to an image DMA 2130, an image DMA 2132, a font expansion unit 2134, a sort circuit 2135 and a bitmap trace unit 2136, to arbitrate memory access requests outputted from these DMAs for connection with the system bus bridge.

A RAM 2002 is a system work memory for the CPU 2001 to operate, which also serves as an image memory for temporarily storing image data under the control of the RAM controller 2124. A ROM 2003 is a boot ROM holding a system boot program, which is controlled by the ROM controller 2125.

The image DMA 2130, connected to an image compression unit 2131, controls the image compression unit 21331 based on information set via a register access ring 2137, to read non-compressed data from the ROM 2003, compress the data, and write the compressed data back.

The image DMA 2132, connected to an image expansion unit 2133, control the image expansion unit 2133 based on information set via the register access ring 217, to read compressed data from the RAM 2002, expand the data, and write the expanded data back.

The font expansion unit 2134 expands compressed font data stored in the ROM 2003 or the RAM 2002 based on a font code included in PDL data transferred from the outside via an LAN controller 2010.

The sort circuit 2135 rearranges the order of objects in a display list generated upon bitmapping the PDL data. Further, the bitmap trace circuit 2136 extracts edge information from the bitmap data.

The IO bus 2127 is a kind of internal IO bus connected to a USB controller as a standard bus, a USB interface 2138, a general serial port 2139, an interrupt controller 2140 and a GPIO interface 2141. The IO bus 2127 includes a bus arbiter (not shown).

An operation interface 2006 is an interface with an operation unit (UI) 2012, which outputs image data to be displayed on the operation unit 2012. Further, the operation interface 2006 transmits information inputted from the operation unit 2012 by a user of the present system to the CPU 2001.

The IO bus 2129 is a kind of internal IO bus connected to a general bus interface 2142 and the LAN controller 2010. The IO bus 2129 includes a bus arbiter (not shown). Further, the general bus interface 2142, comprised of 2 same bus interfaces, serves as a bus bridge to support a standard IO bus. Note that in the present embodiment, PCI buses 2143 are employed.

An external storage unit (HDD) 2004 is a hard disk drive holding system software, image data and the like, connected to one PCI bus 2143 via a disk controller 2144. Further, the LAN controller 2010, connected to the LAN 2011 via a MAC circuit 2145 and a PHY/PMD circuit 2146 for information input/output. Further, a modem 2050 is connected to the public line 2051 for information input/output.

The image ring interface 2147 and the image ring interface 2148 are DMA controllers to connect the system bus bridge 2007 to an image ring 2008 for high-speed image data transfer, so as to transfer compressed tile data between the ROM 2002 and a tile image processor 2149.

The image ring 2008 is comprised of a combination of pair of unidirectional connection paths. The image ring 2008 is connected to a tile expansion unit 2103, a command processor 2104, a status processor 2105 and a tile compression unit 2106 via an image ring interface 2101 and a tile image interface 2102, in the tile image processor 2149. In the present embodiment, 2 tile expansion units 2103 and 3 tile compression units 2106 are employed.

The tile expansion unit 2103 is a bus bridge connected to the image ring interface 2101 and a tile bus 2107, to expand compressed image data inputted from the image ring 2008 and transfer the data to the tile bus 2107. The tile compression unit 2106 is a bus bridge connected to the image ring interface 2102 and the tile bus 2107, to compress uncompressed image data inputted from the tile bus and transfer the data to the image ring 2008.

The command processor 2104, connected to the image ring interface 2101 and the image ring interface 2102 and a register setting bus 2109, to write a register setting request issued from the CPU 2001 and inputted via the image ring 2008 into a corresponding block connected to the register setting bus 2109. Further, based on a register reading request issued from the CPU 2001, the command processor 2104 reads information from a corresponding register via the register setting bus 2109, and transfers the information to the image ring interface 2102.

The status processor 2105 monitors information in the respective image processors, generates an interrupt packet to issue an interrupt to the CPU 2001, and outputs the interrupt packet to the image ring interface 2102. Further, the tile bus 2107 is connected to, in addition to the above blocks, a rendering unit interface 2110, an image input interface 2112, an image output interface 2113, a multivalue conversion unit 2119, a binarization unit 2118, a color space conversion unit 2117, an image rotation unit 2030 and a resolution conversion unit 2116.

The rendering unit interface 2110 inputs a bitmap image generated by a rendering unit 2060 to be described later. The rendering unit 2060 and the rendering unit interface 2110 are connected by a general video signal 2111. The rendering unit interface 2110 makes connection to a memory bus 2108 and the register setting bus 2109 in addition to the tile bus 2107, to convert an input raster image to a tile image by a predetermined method set via the register setting bus 2109 and at the same time performs clock initialization, and to output the tile image to the tile bus 2107.

The image input interface 2112 inputs raster image data subjected to correction image processing by the scanner image processor 2114 to be described later, converts the data to a tile image by a predetermined method set via the register setting bus 2109 and at the same time performs clock synchronization, and outputs the tile image to the tile bus 2107.

The image output interface 2113 inputs the tile image data from the tile bus 2107, converts the data to a raster image and changes a clock rate, and outputs the raster image to a printer image processor 2115.

Then image rotation unit 2030 rotates image data. Further, the resolution conversion unit 2116 changes image resolution. The color space conversion unit 2117 converts color space of color and grayscale image. The binarization unit 2118 binarizes a multivalue (color and grayscale) image. The multivalue conversion unit 2119 converts a binary image to multivalue data.

The external bus interface unit 2120 is a bus bridge to convert and output writing and reading requests, issued from the CPU 2001 via the image ring interfaces 2101, 2102, 2147 and 2148, the command processor 2104 and the register setting bus 2109, to an external bus 2121. In the present embodiment, the external bus 2121 is connected to the printer image processor 2115 and the scanner image processor 2114.

A memory controller 2122, connected to the memory bus 2108, performs writing and reading of image data to/from an image memory 2123 divided into an image memory A and an image memory B by a predetermined address division, in accordance with requests from the respective image processors, and performs a refresh operation or the like in accordance with necessity. The scanner image processor 2114 performs correction image processing on image data scanned by the scanner 2070 as an image input device. The printer image processor 2115 performs correction image processing for printer output, and outputs the result of processing to the printer 2095.

The rendering unit 2060 converts PDL code or an intermediate display list to a bitmap image. The construction of the digital color copier is as described above.

Next, the flow of the direction determination processing of the present invention will be described about a case where the above-described digital color copier is employed as the image processing system 102.

Figure 2:
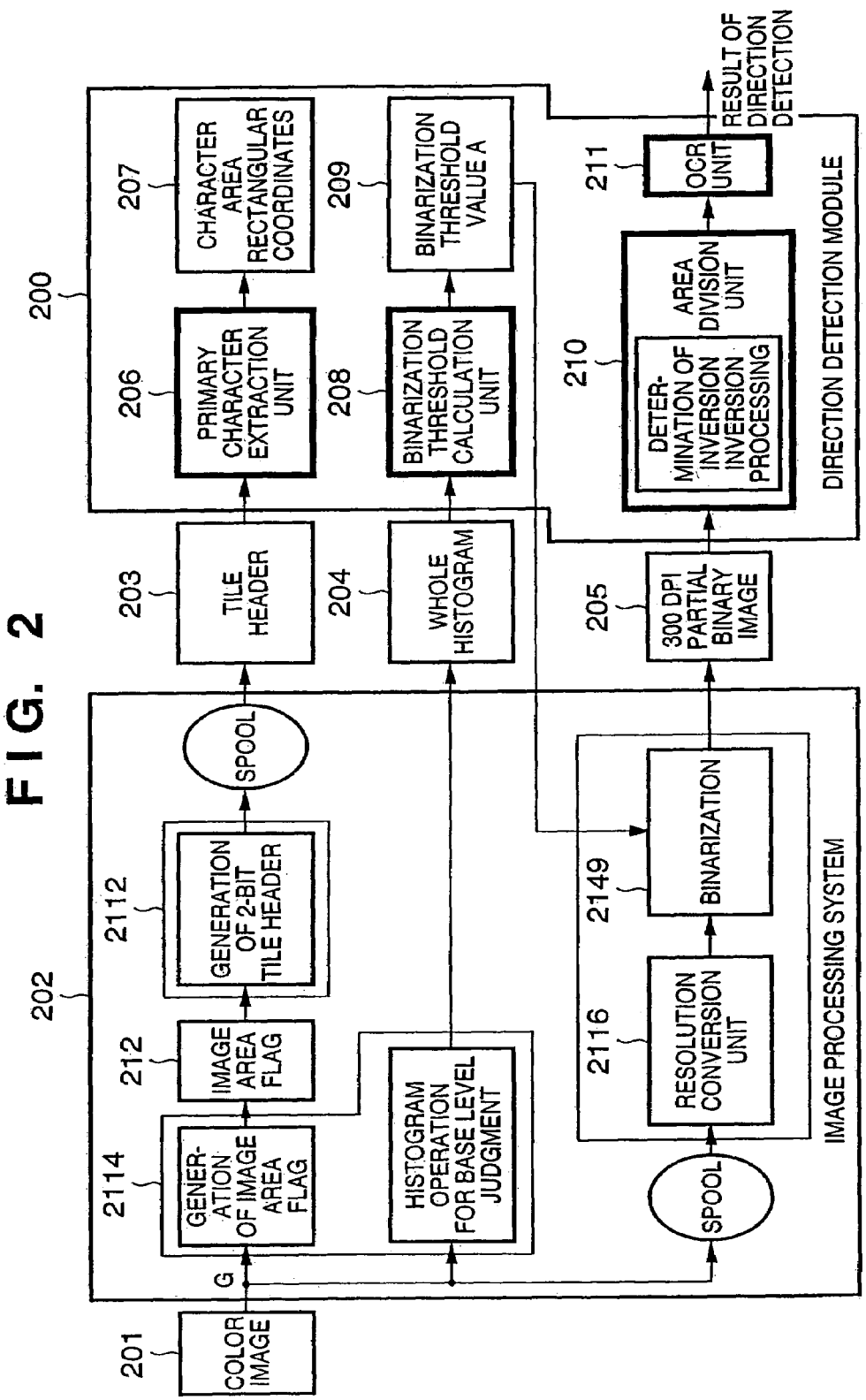
FIG. 2 is a block diagram showing a hardware construction necessary for direction detection processing in a case where a digital color copier in FIGS. 29A to 29C is applied to a general image processing system 102.

FIG. 2 is a block diagram showing a hardware construction necessary for direction detection processing in a case where the digital color copier in FIGS. 29A to 29C is applied to the general image processing system 102. As shown in FIG. 2, numeral 201 denotes a color image as the object of direction detection; and 202, a general image processing system having a CPU, a RAM, a ROM and the like and having hardware functions to perform differential processing of input image, histogram operation, compression/decompression processing, resolution conversion, binarization processing and the like, as in the case of the system in FIG. 1. Note that these functions may be performed by software processing in place of hardware.

Further, as in the case of FIG. 1, the respective parts in a direction detection module 200 are realized by a processor included in the image processing system 102, however, it may be arranged such that they are realized as software functions and performed using a CPU (not shown) (CPU 2001 in the above-described digital color copier).

Hereinbelow, generation of a tile header 203, the histogram information (whole histogram) 204 and the 300 dpi partial binary image 205 will be described with reference to FIGS. 29A to 29C and FIG. 2.

First, plural color images are placed on an ADF of the scanner 2070. In FIG. 2, the color image 201 indicates each of the plural color images sequentially read by the scanner 2070. Note that the color image is read in 600 dpi.

The scanner image processor 2114 inputs the color image 201 and generates an image area flag 212 as 1-bit information per 1 pixel. That is, the image area flag 212 is generated in 600 dpi. The generation of the image area flag 212 is basically differential processing, i.e., setting a window in the color image 201, applying a differential filter to the image, and setting the flag to "1" if the result of differential processing is over a threshold value while setting the flag "0" if the result of processing is not over the threshold value. Since this processing performed by hardware, it is performed at a high speed, and post processing to eliminate "1" appeared on a halftone natural image is also performed. The image area flag information is stored in 1 bit of a channel for the color image. The degree of JPEG compression by the image processor 2149 and a coefficient for output color processing by the printer image processor 2115 are controlled by this information.

The image area flag generation hardware can select a processing signal by setting R, G, B or $a \times R + b \times G + c \times B$ and a coefficient in an internal register. Generally, as a default signal is a G signal, it is assumed in the present embodiment that the G signal is processed and image area flag is generated.

On the other hand, the scanner image processor 2114 performs histogram operation for base level judgment, to generate the whole histogram 204. That is, a histogram of 256 grayscale levels (8 bits) is created for the R, G, B and ND (=A1×R+A2×G+A3×B) signals. The histogram is used as data for calculation of parameter for "base removal" performed by the printer image processor 2115.

The image input interface 2112 performs structural conversion to a tile image. That is, the interface generates the tile header 203 using the image area flag information from image area flag distribution in the tile (32×32 pixels) (accordingly, the tile header information is a 600/32=about 18 dpi image).

That is, in the image processing method according to the present invention, the tile image is a low resolution binary image, generated by counting binary images generated by differentiating an input image by small area.

As the generation of the image area flag information tile header, "if an image area flag equal to or greater than a threshold value T1 exists in a tile, the tile is set to 1". As the order of image input in the image input interface 2112 is a raster sequential order, a 10-bit counter for image width/32 is necessary, and the scale of hardware is increased. Accordingly, in this embodiment, based on a rule that "if an image area flag equal to or greater than a threshold value T1 exists in even 1 of tile 32 lines, the tile is set to 1", the image area flag information tile header is generated.

That is, in the image processing method according to the present invention, a binary image of image area flags having a value "1" if a corresponding pixel is equal to or greater than a predetermined value, or a value "0" if a corresponding pixel is less than the predetermined value, is generated, and a tile image is generated such that in a tile header, a tile where the number of "1N" image area flags is equal to greater than a predetermined threshold value is set to "1", and a tile where the number of "1" image area flags is less than the predetermined threshold value is set to "0".

Further, in this embodiment, the image area flag information tile header is generated for 2 bits. That is, 1 bit is generated as "if an image area flag equal to or greater than a threshold value T1 exists in even 1 of tile 32 lines, the tile is set to 1", and the other 1 bit is generated as "if an image area flag equal to or greater than a threshold value T2 exists in even 1 of tile 32 lines, the tile is set to 1" (T1>T2).

That is, in the image processing method according to the present invention, plural tile images are generated using plural different threshold values, then a comparison is made among the plural tile images, and a character area included in the input image is extracted. Further, the feature of the image processing method according to the present invention is that plural low resolution images are generated using plural different threshold values. Further feature of the image processing method according to the present invention is that a group of connected pixels extracted from plural low resolution images is compared with the plural low resolution images, and a character area is extracted.

Note that as the image area flag 212 is differential information, a large number of flags 212 appear in a portion of a differential-filtered area with a large level difference. Accordingly, in case of a black character on white base, a large number of image area flags 212 appear, however, in case of a character with a small level difference between the character and the base, the number of flags is smaller than that of the black character. By utilizing this characteristic, 2 image area flag distribution information (tile headers) 203 are generated from the threshold values T1 and T2, and further accurate character area coordinate detection is performed by the primary character extraction unit 206.

That is, in the image processing method according to the present invention, the tile image is a low resolution differential image generated by counting differential information of input image by small area.

The color image data (RGB), a channel data including the image area flag data and the tile header information are compressed in the image processor 2149. More specifically, the RGB data is subjected to JPEG compression and the a channel data is subjected to reversible compression in the tile compression unit 2106 (not shown in FIG. 2) in the image processor 2149. As the tile header itself is not compressed, the tile header information can be read at a high speed. Then the data is spooled in the RAM 2002.

Next, a procedure for generating the 300 dpi partial binary image 205 from the spooled image will be described.

The image spooled in the RAM 2002 is delivered through the image ring interfaces 2147 and 2101 to the image processor 2149. The image data expanded through the tile expansion unit 2103 is converted from 600 dpi to 300 dpi in the resolution conversion unit 2116. Thereafter, the data is binarized (to 00 and ff values) with a designated threshold value in the color space conversion unit 2117. The result of 8 to 1 bit conversion of the data is returned through the image ring interfaces 2102 and 2148 to the system controller 2150. Then, a partial binary image is written into the RAM 2002.

As described above, in the image processing system (color digital copier), the tile header 203, the hole histogram 204, and the 300 dpi partial binary image 205 are generated.

Figure 3:
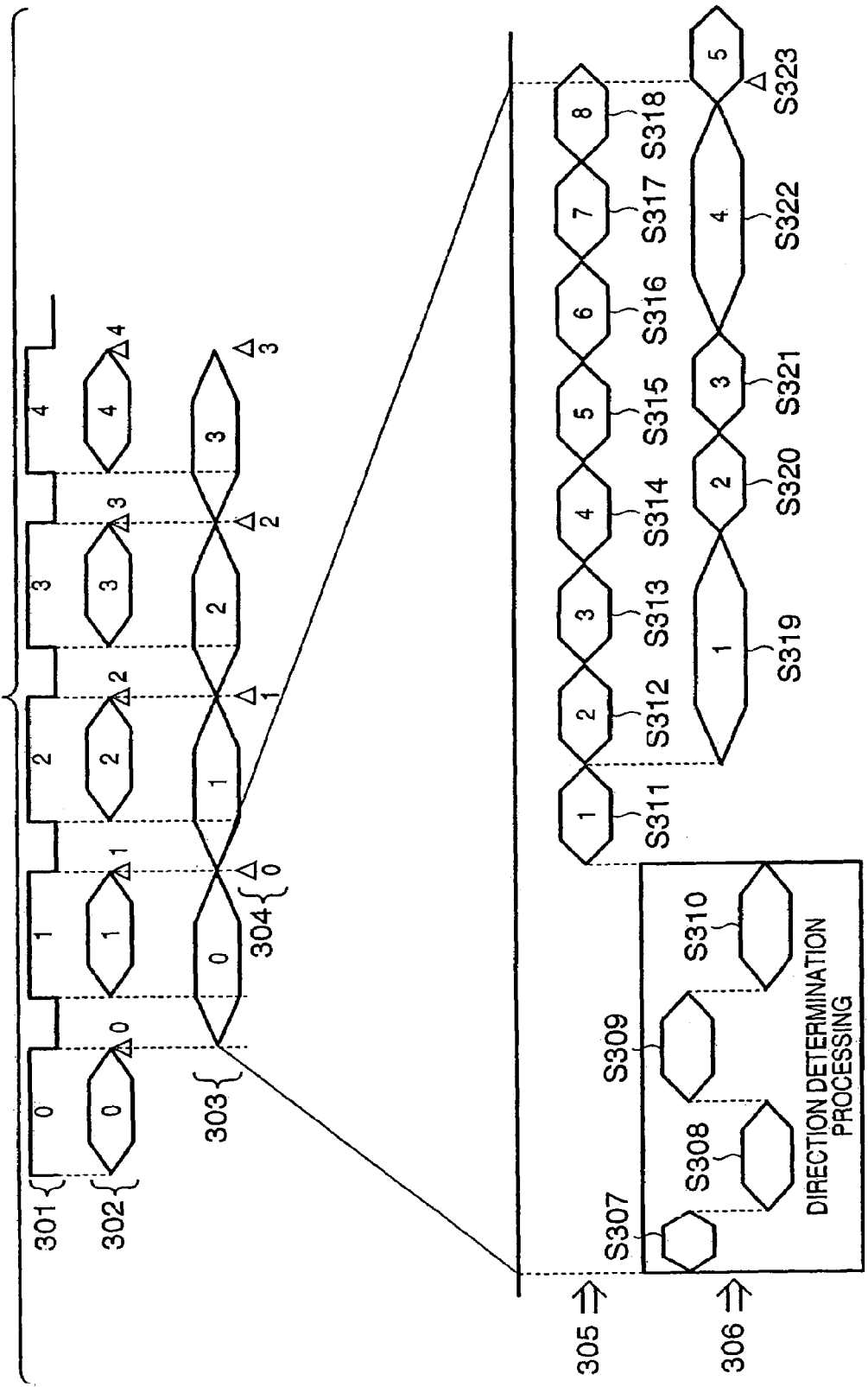
FIG. 3 is a timing chart showing respective operations of an image processing system 202 in FIG. 2.

FIG. 3 is a timing chart showing respective operations of the image processing system 202 in FIG. 2. Hereinbelow, the flow of processing in the image processing system 202 will be described with reference to FIG. 3. In FIG. 3, numeral 301 denotes the timing of the scanner and respective numerical values "0" to "4" indicates the order of color images (originals) placed on the ADF. Further, the timing of the scanner image processor 2114, denoted with numeral 302, is performed in synchronization with the scanner. Note that as the generation of the tile header and the histogram operation for base removal are completed at timing indicated with each symbol "Δ", the tile header 203 and the whole histogram 204 are formed at this timing.

Further, numeral 303 denotes the timing of direction determination processing which is executed in software processing utilizing the CPU 2001. As the CPU 2001 performs plural tasks, the CPU is not occupied as indicated in timing 306 in FIG. 3 but the other tasks are performed. However, in the present embodiment, the other tasks are not shown for the sake of convenience. The direction determination processing is started at the timing indicated with each symbol "Δ". In FIG. 3, numerals 305 and 306 denote the details of the direction determination processing on some color image. Note that numeral 305 denotes hardware processing; and 306, software processing.

The software processing 306 will be described in detail. First, the histogram data is read (step S307). More particularly, the CPU refers to the histogram data in the scanner image processor. The histogram to be read in this case is a G histogram corresponding to the signal used in the image area flag generation. The CPU performs the binarization threshold calculation software to obtain a threshold value A (step S308). Next, the CPU reads the tile header existing in the RAM (step S309). After the reading of the tile header, the CPU performs the primary character extraction processing (step S310).

Figure 26:
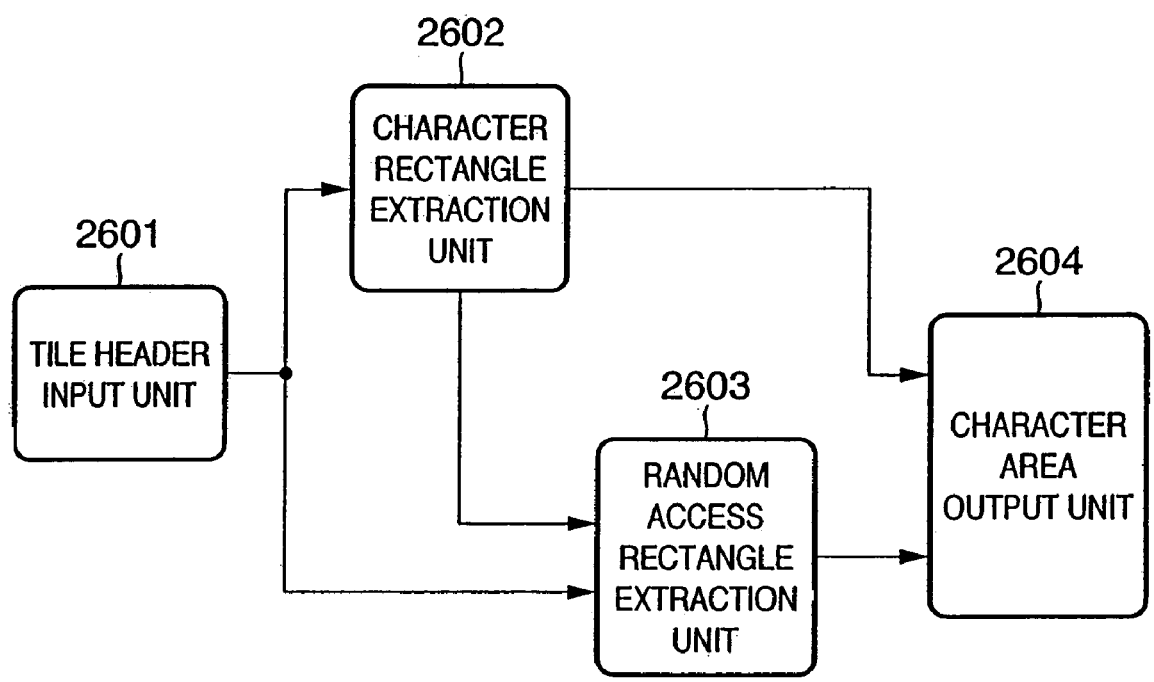
FIG. 26 is a block diagram showing the detailed construction of a primary character extraction unit to perform the primary character extraction processing.

Note that the primary character extraction processing means limiting a portion including characters and selecting the portion as a small rectangular area from the entire image. FIG. 26 is a block diagram showing the detailed construction of the primary character extraction unit to perform the primary character extraction processing by hardware. Note that in the present embodiment, the primary character extraction processing is executed as software processing.

In FIG. 26, a tile header input unit 2601 inputs 2 tile header images 203 spooled in the RAM 2002. Further, a character rectangle extraction unit 2602 extracts a rectangular area with a high probability of existence of a set of characters, from the 2 tile header images. Further, a random access rectangle extraction unit 2603 simply divides the entire image into approximately uniform rectangular areas, and extracts a rectangular area with at least a low probability of existence of character. Then, a character area output unit 2604 integrates the group of rectangles extracted by the character rectangle extraction unit 2602 and the random access rectangle extraction unit 2603, and outputs as plural character areas.

Figure 27:
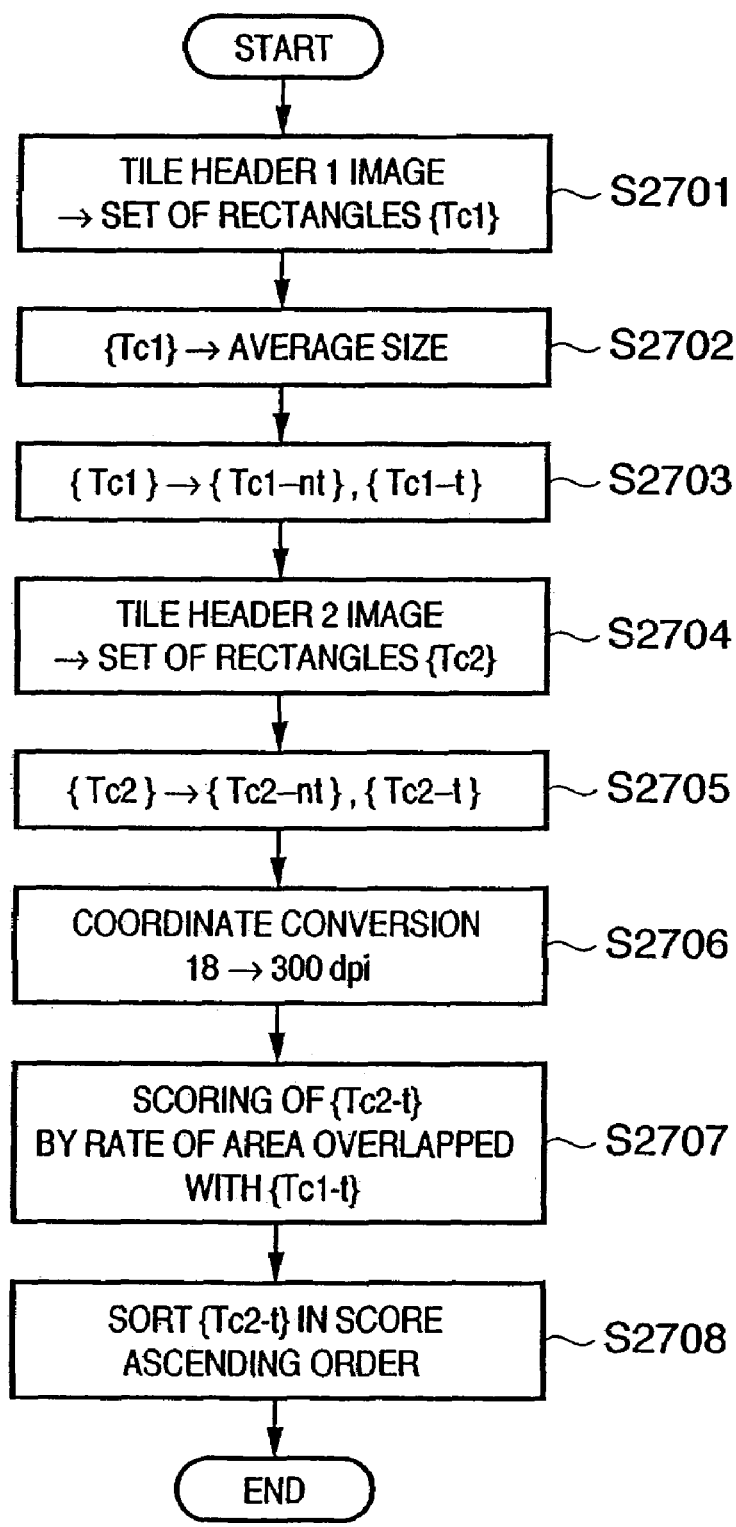
FIG. 27 is a flowchart showing the detailed processing procedure by a character rectangle extraction unit 2602 to perform the primary character extraction processing (S310)

FIG. 27 is a flowchart showing the detailed processing procedure by the character rectangle extraction unit 2602 to perform the primary character extraction processing (S310). First, all the connected black pixels are extracted from tile header 1 image, and coordinates of respective circumscribed rectangles thereof are obtained (step S2701). The set of rectangular information is referred to as {Tc1}.

Next, an average size of all the rectangles is obtained except rectangles having an extremely large/small area and a high oblateness among the set of rectangles {Tc1} (step S2702). Further, a set of rectangles having a size greatly different from the average size of the set of rectangles {Tc1} is determined as a non-text rectangles {Tc1-nt}, and others, as text rectangles {Tc1-t} (step S2703).

Further, all the connected black pixels are extracted from the tile header 2 image, and coordinates of the respective circumscribed rectangles are obtained (step S2704). The set of rectangular information is referred to as {Tc2}. Note that in the present embodiment, at steps S2701 and S2704, the processing of extracting the connected black pixels is performed using well-known labeling, however, it may be performed using other well-known edge line tracing.

That is, the feature of the image processing method according to the present invention is extracting an area in the image, corresponding to connected pixels extracted from a low-resolution image, as a character area.

Further, in the set of rectangles {Tc2}, a set of rectangles having an area equal to or smaller than a predetermined area is determined as a set of non-text rectangles {Tc2-nt}, and a set of rectangles having an area larger than the predetermined area, as text rectangles {Tc1-t} (step S2705). The threshold value of determination by area is a previously-determined appropriate value. Then the coordinates of the respective rectangles are converted from 18 dpi tile header coordinate values to 300 dpi coordinate values (step S2706).

Further, regarding each rectangle of the set of rectangles {Tc2-t}, the total sum of areas among the set of rectangles {Tc1-t} having coordinates overlapped with the rectangle is divided by the area of the rectangle, and the obtained value is set as a score of the rectangle (Step S2707). A rectangle having a high score is considered as an area with a high probability of characters observed as text in the both tile header 1 and the tile header 2.

The set of rectangles {Tc2-t} are sorted in ascending order of the scores (step S2708). The sorted set of rectangles {Tc2-1} becomes the result of processing by the character rectangle extraction unit 2602.

Figure 28:
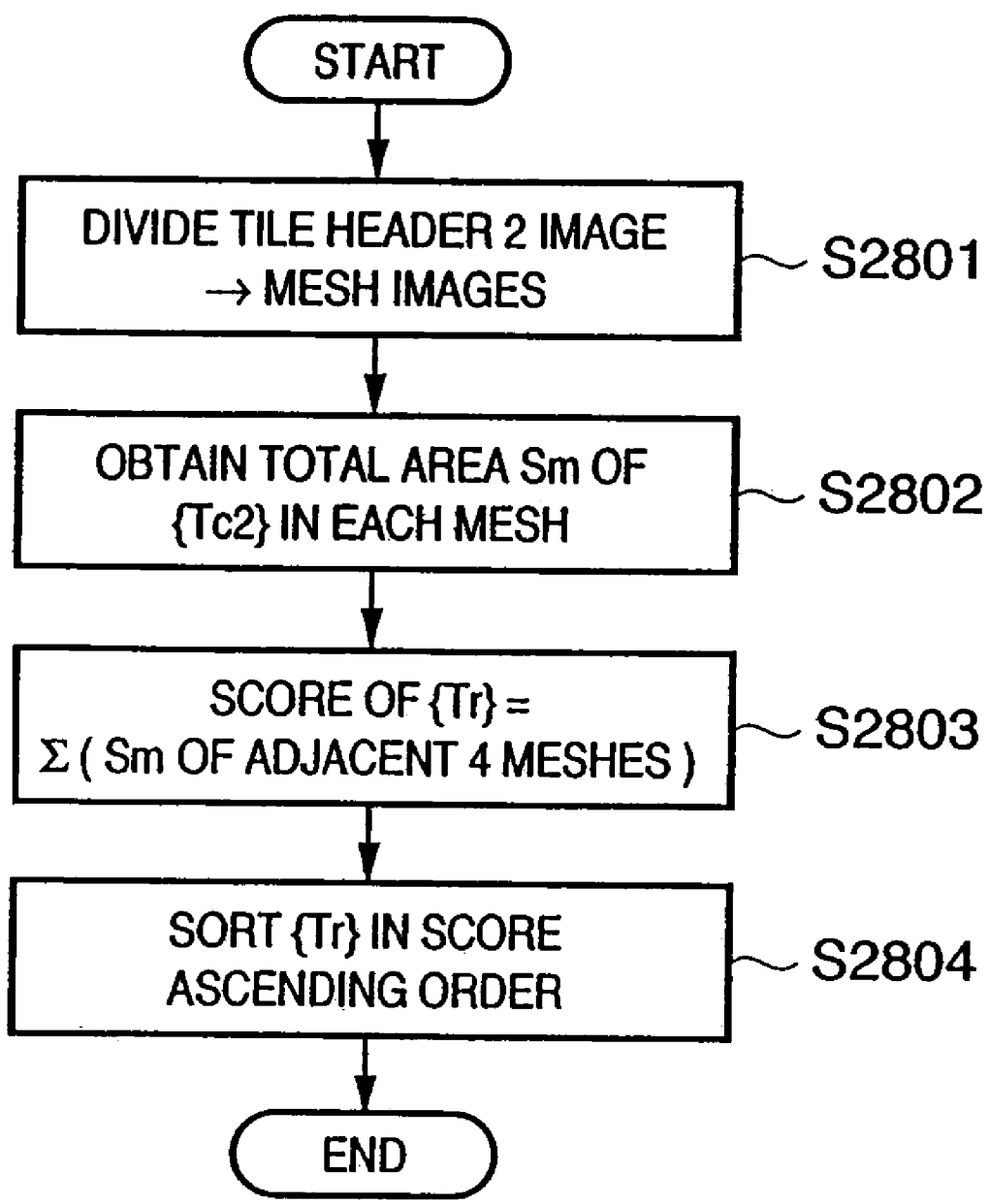
FIG. 28 is a flowchart showing the detailed processing procedure by a random access rectangle extraction unit 2603.

On the other hand, FIG. 28 is a flowchart showing the detailed processing procedure by the random access rectangle extraction unit 2603. First, the tile header image 2 is divided into meshes by a small rectangle having a predetermined area (step S2801). Note that the mesh area is previously determined in consideration of a partial image size for efficient processing in the subsequent stage. However, the mesh area may be dynamically changed in correspondence with the size of input image. Further, to avoid noise which occurs in an image peripheral portion, a margin may be set except a predetermined peripheral width before mesh division is performed.

Next, in each mesh, the total sum Sm of areas of the {Tc2} rectangles included in the mesh is obtained (step S2802). Then 4 adjacent meshes are defined as 1 random access rectangle Tr (step S2803). Then the total sums Sm of the 4 meshes is added up as a score of the Tr rectangle.

Next, the set of all the Tr rectangles, {Tr} is sorted in ascending order of the scores (step S2804). At this time, overlap between Tr rectangles is avoided. If overlapped 2 Tr rectangles exist, an overlapped portion of a lower score rectangle is removed and registered again as a new Tr. Then the Tr rectangles are sorted again in ascending order of the scores. The sorted set of rectangles (Tr) becomes the result of processing by the random access rectangle extraction unit 2603.

Finally, the output unit 2604 outputs rectangles having a score equal to or greater than a predetermined threshold value in descending order, from the set of rectangles {Tc2-1}. The output unit abandons remaining Tc2-t rectangles having scores less than the threshold value, and outputs the set of rectangles {Tr} in the order of scores. When there is no rectangle or a predetermined number of rectangles have been outputted, the processing in the output unit 2604 ends.

That is, the feature of the image processing method according to the present invention is that a low resolution image is divided into meshes, and a character area is extracted based on distribution of pixels within each mesh area. Further, another feature of the image processing method according to the present invention is that a character area extracted using connected pixels extracted from a low resolution image and a character area determined based on distribution of pixels within each mesh area are selectively outputted.

Plural character area coordinates are obtained by the above-described primary character extraction. An image reading table is generated on the RAM in accordance with the result of processing, and when the CPU makes a program kick, the 300 dpi partial binary images 205 are sequentially read by DMA processing by the image ring interface 2147. Upon completion of reading from the first area (area 1) (step S311), area division processing (hereinbelow, referred to as "BS processing") and the OCR task are performed on the area 1 (step S319) (hereinbelow, referred to as "BSOCR processing"), and the result of processing is stored in the BSOCR task.

In parallel to the BSOCR processing on the area 1, the 300 dpi binary image from an area 2 is performed. As the BSOCR processing requires sufficient time in comparison with image reading (hardware processing), the image data is provided prior to the BSOCR processing. The result of BSOCR processing on the area 2 is stored and added in the BSOCR task. When the processing time runs out, the BSOCR task calculates a final result of direction determination from the result of stored results and outputs the final result.

Figure 6:
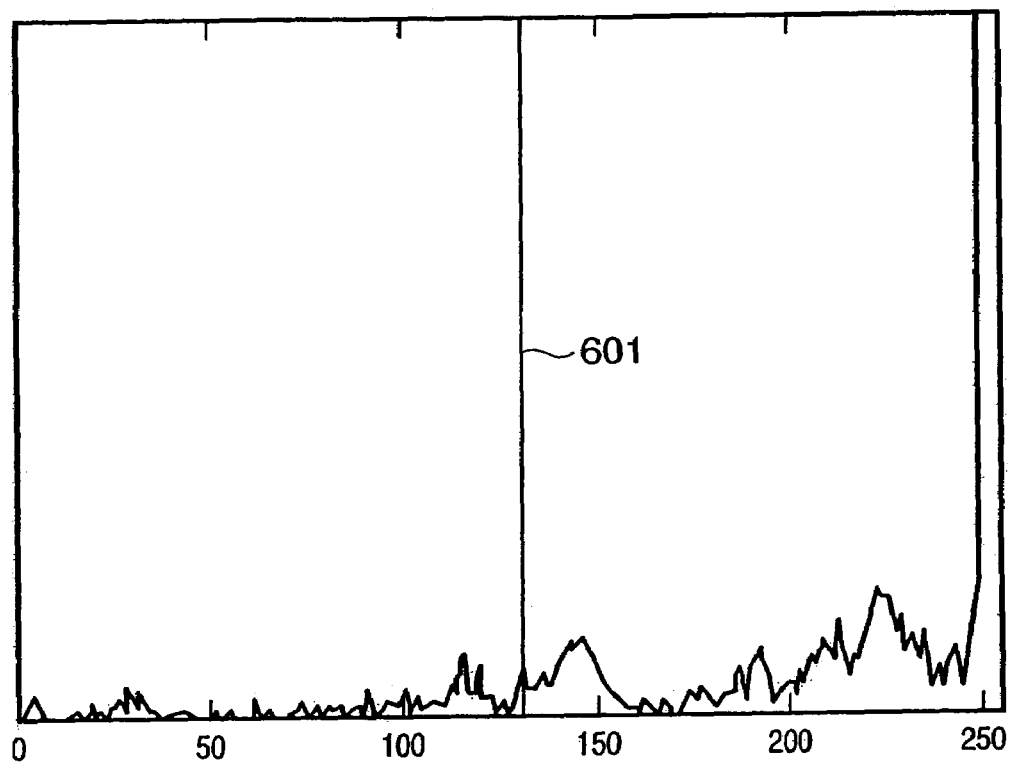
FIG. 6 is a graph showing a whole histogram of the color image in FIG. 4.

Next, a particular example of the above-describe direction determination processing will be described with reference actual 2 images. In this case, a color image as shown in FIG. 4 is processed. FIG. 4 shows an example of a color image used in the direction determination processing according to the first embodiment. FIG. 5 shows an image as a result of tile header generation with threshold values T1=15 and T2=1 in the scanner image processor 2114. In FIG. 5, an image 501 is a result of processing with the threshold T1=15, and an image 502, a result of processing with the threshold T2=1. ON the other hand, in the scanner image processor 2114, the histogram operation for base removal is not performed but a histogram as shown in FIG. 6 is obtained. FIG. 6 shows a whole histogram of the color image in FIG. 4. Then, an optimum binarization threshold value A=128 denoted with numeral 601 is calculated from the histogram in FIG. 6.

The primary character extraction unit outputs rectangular areas arranged in the order of scores of probability of character area by the processing procedure shown in the flowchart of FIG. 27. FIG. 7 is an example of a processed result showing 3 rectangular areas finally extracted by the primary character extraction processing. Note that actually more areas are extracted from this image, however, for the sake of convenience, 3 areas are extracted. Further, as rectangles obtained by the random access rectangle extraction are positioned in lower ranks in the score order, they are ignored.

In FIG. 7, an image reading table for areas 701 to 703 is generated on the RAM, and when the image ring interface is kicked, resolution conversion are performed on the respective areas, and binary images are sequentially read. FIG. 8 shows a read image (partial binary image) from the area 701. FIG. 9 shows a read image (partial binary image) from the area 702. FIG. 10 shows a read image (partial binary image) from the area 703.

Upon completion of reading from the area 701, the direction determination enters the BSOCR processing loop. The BSOCR processing for the area 701 is performed by the CPU. The BS (area division) processing includes image inversion determination processing and inversion processing. More particularly, the number of black pixels and the number of white pixels of an input binary image are counted, and if the percentage of black pixels is e.g. 70%, it is determined that the image is an inverted image.

FIG. 11 shows the result of area division of a partial binary image determined as an inverted image by the BS processing on the image read from the area 701 in FIG. 8. FIG. 12 is an example of the result of general BSOCR processing on the inverted image resulted from pixel inversion processing on the area 701 in FIG. 8. In FIG. 11, an area indicated with a red rectangular RD1 is recognized as a character area. The display of rectangle is made as white characters on black base according to the specifications of a GUI application. An actual image is inverted, and the image in FIG. 12 is subjected to the BS processing and the area resulted from the BS processing surrounded with a black rectangle BK1 is subjected to the OCR processing.

Note that it is preferable that in the OCR processing, the result of direction determination is the total of processing results in plural areas. For example, in a case where 200 characters exist in 1 area, to avoid time out of processing time while 4 direction OCR processing is performed on the 200 characters, the number of characters per 1 area is limited. That is, the limited number of characters per 1 area is 30. As a result of OCR processing of the image in FIG. 12, the accuracy of 0° in processing of 30 characters is increased. Further, if processing time remains, the BSOCR processing is performed on the previously-read image of the area 702. The area 702 is the binary image in FIG. 9. It is determined by the BS processing that this area is not an inverted image, and it is determined that an area indicated with a black rectangle RD2 in FIG. 13 is character area. FIG. 13 shows the result of area division of the partial binary image in FIG. 9. This area is subjected to the OCR processing, and further the result of direction determination of 30 characters is obtained.

Figure 14:
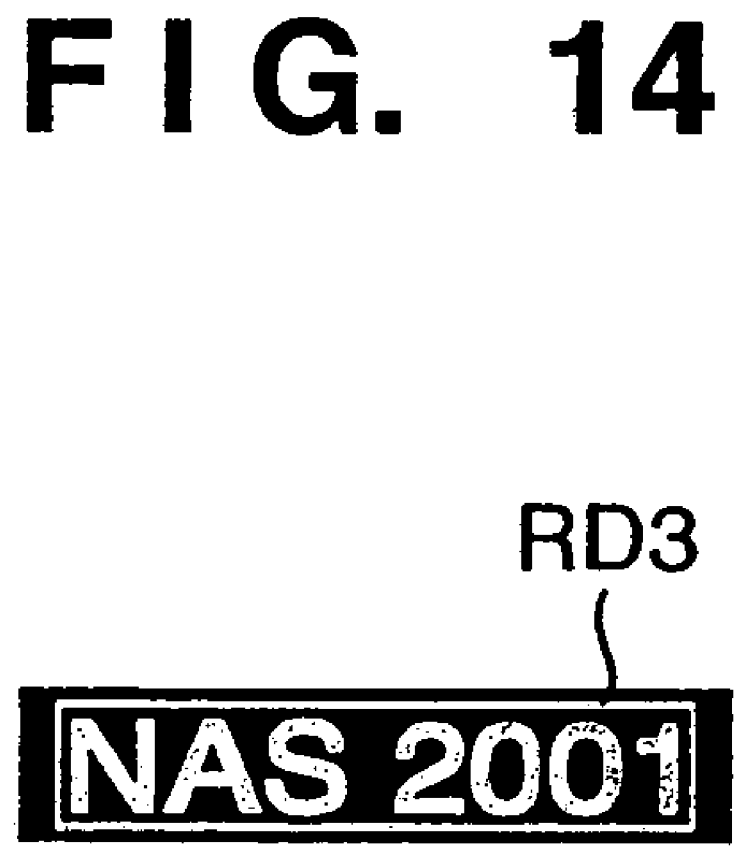

When the areas 701 and 702 have been processed, if processing time remains, the BSOCR processing is performed on the previously-read image of the area 703. The area 703 is the binary image in FIG. 10. It is determined by the BS processing that the area is an inverted image, and pixel inversion processing is performed as shown in FIG. 15, and an area indicated with a black rectangle of the binary image in FIG. 15 (red rectangle RD3 in FIG. 14) is determined as a character area and OCR processed. FIG. 14 shows the result of the area division of the partial binary image in FIG. 10. FIG. 15 shows an image inverted from the result of the area division of the partial binary image in FIG. 10. If the processing time expires at this time, the OCR calculates the results of direction recognition stored inside, and outputs the result of 0°.

That is, the feature of the image processing method according to the present invention is that it is determined whether or not a character area is an inverted image based on a binary image of an input image, and if it is determined that the character area is an inverted image, black and white components of the binary image are inverted.

Figure 16:
FIG. 16 is an example of a second color image subjected to the direction detection processing according to the first embodiment.
Figure 17:
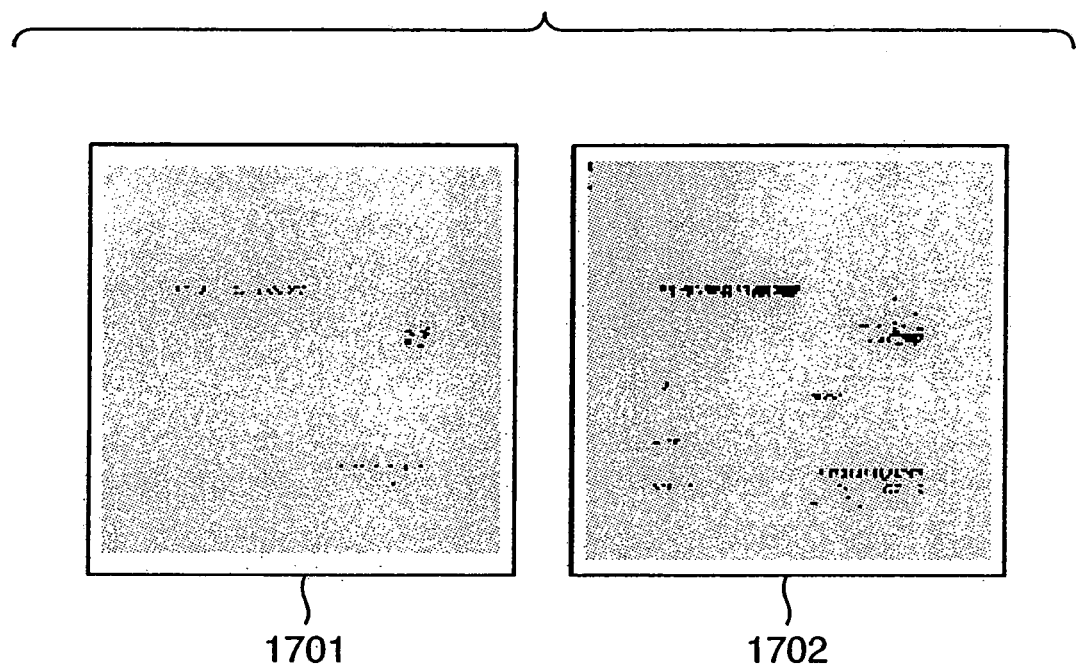
FIG. 17 is an example of images resulted from tile header generation with the threshold values T1=15 and T2=1 from the color image in FIG. 16.
Figure 18:
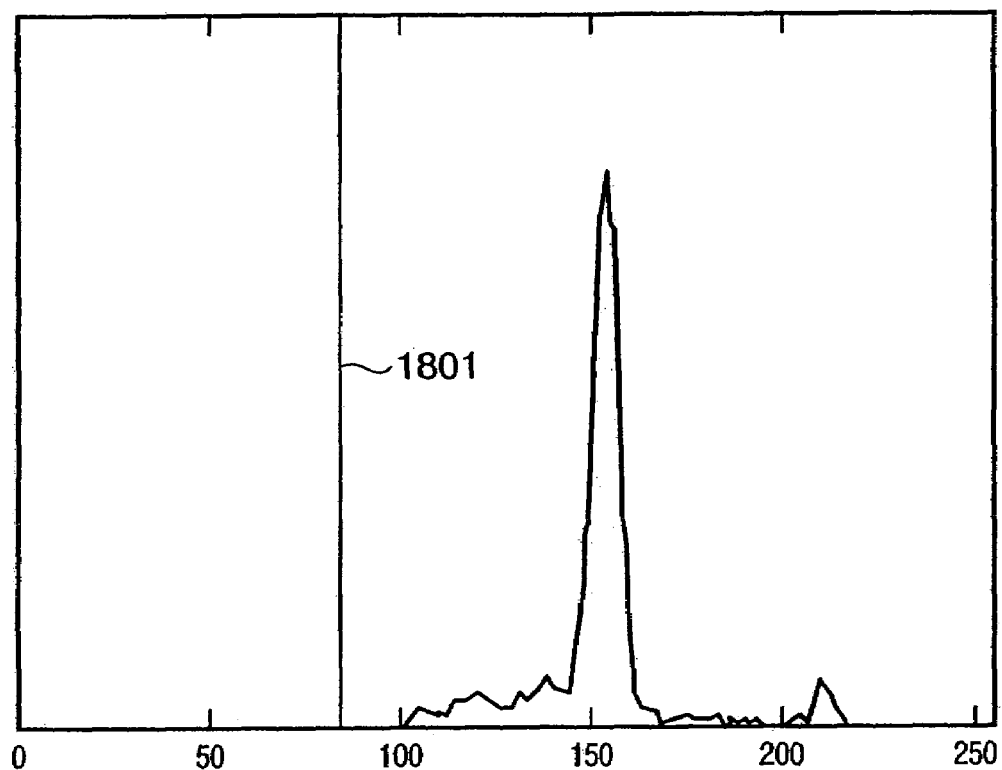
FIG. 18 is a graph showing a histogram for base removal for the color image in FIG. 16.

FIG. 16 is an example of a color image different from the color image in FIG. 4 subjected to the direction detection processing according to the first embodiment. The level difference of G plane is not large in the entire image, and if the tile header generation is performed using the same threshold values (T1=15 and T2=1) as those in the processing of the color image in FIG. 4, the results as shown in FIG. 17 are obtained. FIG. 17 shows images resulted from the tile header generation with the threshold values T1=15 and T2=1 from the color image in FIG. 16. On the other hand, FIG. 18 is a graph showing a histogram for base removal for the color image in FIG. 16. As direction determination preprocessing, an optimum binarization threshold value A=66 denoted with numeral 1801 is calculated from the histogram in FIG. 18.

Figure 19:
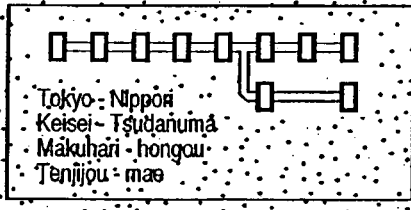
FIG. 19 is an example of processed result showing 3 rectangular areas finally extracted by the primary character extraction processing.

In the primary character extraction, the processing shown in the flowchart of FIG. 27 is performed on images 1701 and 1702, but appropriate character rectangles cannot be extracted. However, by performing the processing shown in the flowchart of FIG. 28, portions determined as areas including some information which can be or cannot be characters, are outputted as random access rectangles. In this example, 3 areas as shown in FIG. 19 are outputted. That is, FIG. 19 shows processed 3 rectangular areas finally extracted by the primary character extraction processing. Note that actually more areas are extracted from this image, however, for the sake of convenience, 3 areas are extracted.

Figure 20:
FIG. 20 is an example of a read image (partial binary image) from an area 1901.
Figure 22:
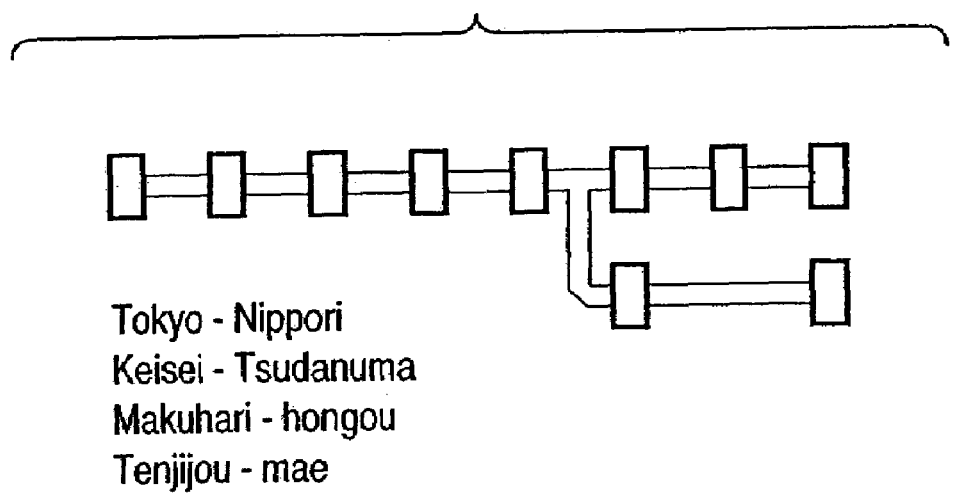
FIG. 22 is an example of a read image (partial binary image) from an area 1903.

An image reading tables for areas 1901 to 1903 is generated on the RAM and when the image ring interface is kicked, resolution conversion is performed on the respective areas, and binary images are sequentially read. FIG. 20 shows a read image (partial binary image) from the area 1901. FIG. 21 is an example of a read image (partial binary image) from the area 1902. FIG. 22 shows a read image (partial binary image) from an area 1903.

Upon completion of reading from the area 1901, the direction determination enters the BSOCR processing loop. The BSOCR processing for the area 1901 is performed by the CPU. In the image as shown in FIG. 20, it is determined as the result of area division that there is no character and the OCR processing is not performed. In the binary image in FIG. 21, an area surrounded with a red rectangle RD4 in FIG. 23 is recognized as a character area. That is, FIG. 23 shows the result of area division on the partial binary image in FIG. 21. This area is subjected to the OCR processing and the result of direction determination for 30 characters can be obtained.

Figure 24:
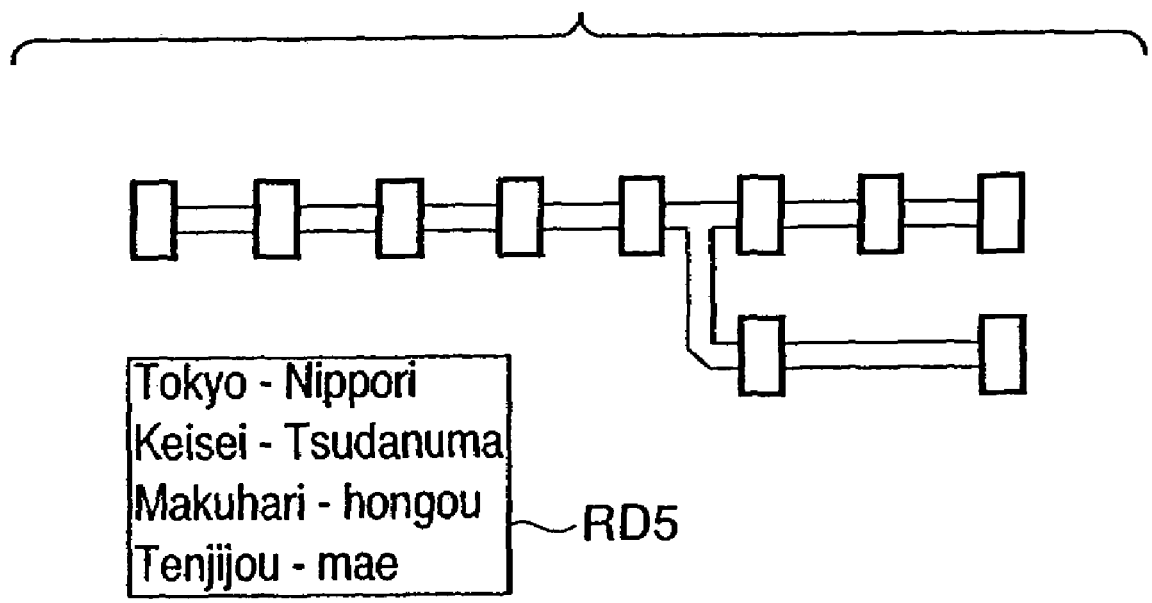
FIG. 24 is an example of the result of the area division of the partial binary image in FIG. 22.

When the areas 1901 and 1902 have been processed, if time remains, the BSOCR processing is performed on the previously-read image of the area 1903. In the binary image in FIG. 22, an area surrounded with a red rectangle RD5 in FIG. 24 is recognized by the BS processing as a character area. That is, FIG. 24 shows the result of area division of the partial binary image in FIG. 22. This area is subjected to the OCR processing, and further result of direction determination for 30 characters can be obtained. Assuming that the processing time runs out, the OCR calculates the direction determination results stored inside and outputs the result of 0°.

As described above, the feature of the image processing method according to the present invention is that the direction of an image including a character area inputted into a computer is detected by generating a binary image, then generating a tile image by adding a predetermined value to tiles each defined as a predetermined size area in the binary image, then extracting an area corresponding to an area within a circumscribed rectangle surrounding connected pixels having the same value in the tile image, as character area, from the binary image, recognizing the directions of the characters included in the character area, and detecting the direction of the image.

Further, the feature of the image processing method according to the present invention is that respective characters included in a character area are extracted, and the direction of the extracted characters is recognized, and the direction of the character area is detected based on the result of recognition of the direction of the characters included in the character area.

Second Embodiment

In the above-described first embodiment, the binarization threshold value A is calculated from the whole histogram provided by the image processing system, however, in the present invention, the binarization threshold value may be a fixed value of, e.g., "128". In case of fixed threshold value, the binarization can be performed even if the image processing system side lacks the whole histogram operation unit.

Further, in the above-described first embodiment, the area division processing is performed on the 300 dpi partial image, however, the processing may be omitted. In this case, the time necessary for the area division processing can be saved, and the OCR processing can be performed on more areas. However, in a case where character cutting cannot be made without any processing from images detected by the primary character extraction processing, the result of direction detection becomes poor. Then the primary character extraction processing may be arranged such that an area to be subjected to the subsequent area division processing and an area not to be subjected to the area division processing are designated. In this case, the accuracy of direction detection can be maintained and the processing speed is increased.

Further, in the first embodiment, the partial image is a 300 dpi binary image, however, the present invention is not limited to this image. It may be arranged such that a partial multivalue image is read. In this case, the direction detection side requires a function of binarizing the partial multivalue image. In this arrangement, optimum binarization can be performed on the partial area.

Figure 25:
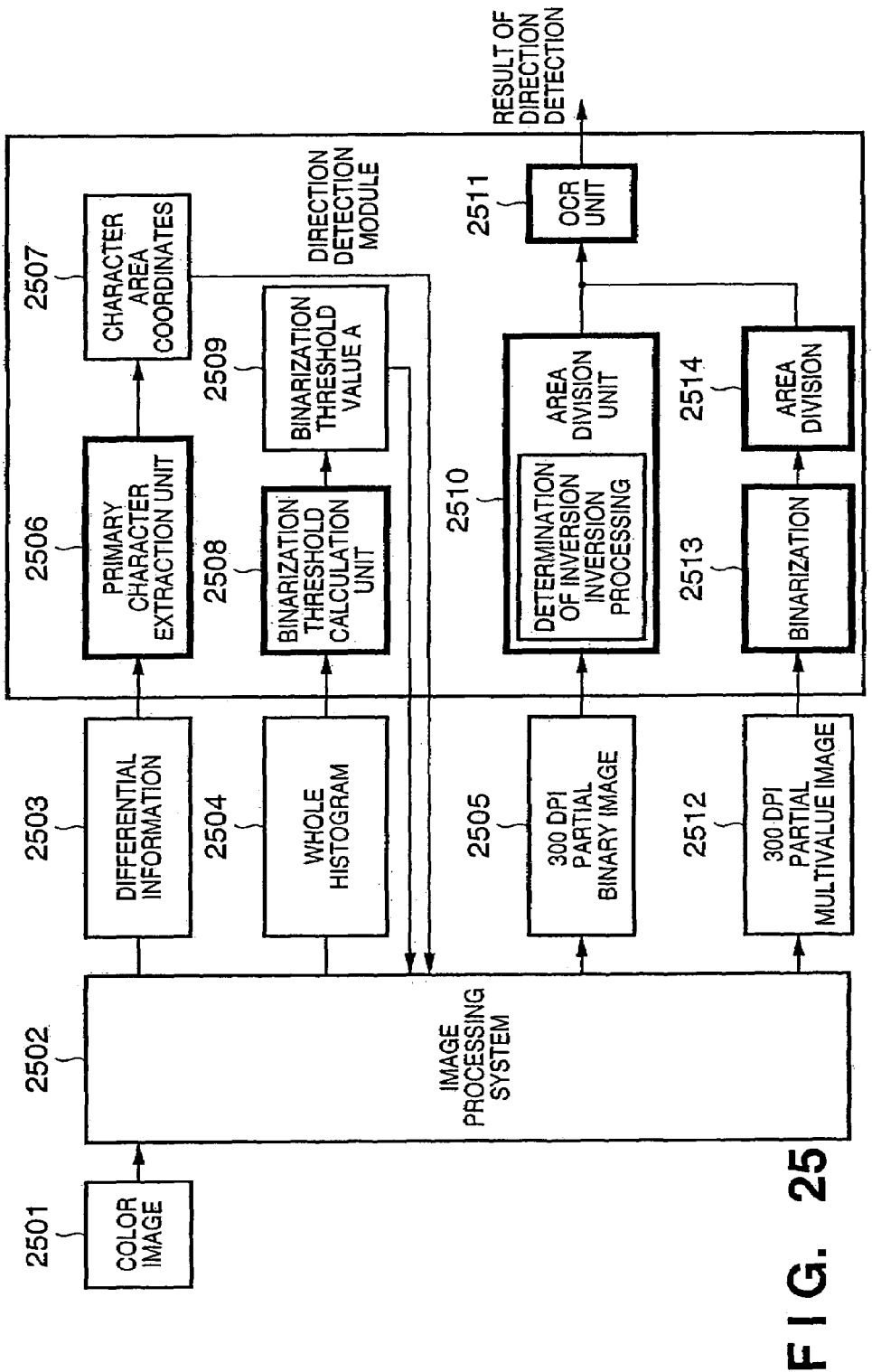
FIG. 25 is a block diagram showing the construction of the image processing apparatus having a multivalue-image reading function, according to a second embodiment of the present invention.

Further, considering data size, the time for reading a multivalue image is longer that for reading a binary image. Accordingly, it is effective that in the primary character extraction processing, it is determined whether a binary image reading or multivalue image reading is to be performed based on the distribution of differential information, and the image processing system is instructed to select binary image reading or multivalue image reading in accordance with the determination. FIG. 25 is a block diagram showing the construction of the image processing apparatus having a multivalue-image reading function, according to the second embodiment of the present invention. The character area coordinate information includes the designation of reading method (binary or multivalue), and the image processing system reads a partial image by DMA operation in accordance with the designation. In a case where a binary image is read, the same processing as that in the first embodiment is performed. In a case where a multivalue image 2512 is read, partial-area optimum binarization processing 2513 is performed. In a case where this optimum binarization processing includes inversion determination and an inversion function, the inversion determination is not necessary in the subsequent area division processing 2514.

OTHER EMBODIMENT

The present invention can be applied to a system constituted by a plurality of devices (e.g., a host computer, an interface, a reader and a printer) or to an apparatus comprising a single device (e.g., a copy machine or a facsimile apparatus).

Further, the object of the present invention can also be achieved by providing a storage medium (or recording medium) holding software program code for performing the aforesaid processes to a system or an apparatus, reading the program code with a computer (e.g., CPU, MPU) of the system or apparatus from the storage medium, then executing the program. In this case, the program code read from the storage medium realizes the functions according to the embodiments, and the storage medium holding the program code constitutes the invention. Furthermore, besides aforesaid functions according to the above embodiments are realized by executing the program code which is read by a computer, the present invention includes a case where an OS (operating system) or the like working on the computer performs a part or entire actual processing in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

As described above, according to the present invention, as a character area is detected utilizing plural low resolution images comprised of differential information of a color image, an image input direction can be efficiently detected, from an image with much differential information to an image with little differential information. Further, according to the present invention, as the system has the inversion determination unit, the character recognition can be performed in an inverted character portion, and the input direction can be detected even in a color image having many inverted character portions. Further, according to the present invention, as high-speed software processing can be performed with a small work memory, the cost of parts necessary for version updating of the direction detection processing can be reduced.

The present invention is not limited to the above embodiments and various changes and modifications can be made within the spirit and scope of the present invention. Therefore, to appraise the public of the scope of the present invention, the following claims are made.

What is claimed is:

1. An image processing method for detecting a direction of an image including a character area, inputted into a computer, said method comprising:
    a binary image generation step of generating a binary image of said input image;
    a tile image generation step of generating a tile image that comprises a plurality of tiles, wherein a value of each tile in the tile image is generated based on a predetermined size area in said binary image;
    a character area extraction step of extracting an area in said binary image, corresponding to an area in a circumscribed rectangle surrounding connected pixels having the same value in said tile image, as a character area;
    a determination step of determining whether or not said character area is an inverted image based on the binary image of said image;
    an inversion processing step of inverting black and white components of said binary image if it is determined at said determination step that said character area is an inverted image; and
    a direction detection step of recognizing a direction of characters included in said character area of the binary image inverted in said inversion processing step, and thereby detecting the direction of said image.

2. An image processing apparatus for detecting a direction of an image including a character area, inputted into a computer, said apparatus comprising:
    binary image generation means for generating a binary image of said input image;
    tile image generation means for generating a tile image that comprises a plurality of tiles, wherein a value of each tile in the tile image is generated based on a predetermined size area in said binary image;
    character area extraction means for extracting an area in said binary image, corresponding to an area in a circumscribed rectangle surrounding connected pixels having the same value in said tile image, as a character area;
    determination means for determining whether or not said character area is an inverted image based on the binary image of said image;
    inversion processing means for inverting black and white components of said binary image if said determination means determines that said character area is an inverted image; and
    direction detection means for recognizing a direction of characters included in said character area of the binary image inverted in said inversion processing means, and thereby detecting the direction of said image.

3. A computer readable medium storing a computer program for a computer to execute:
    a binary image generation procedure of generating a binary image of an input image including a character area;
    a tile image generation procedure of generating a tile image that comprises a plurality of tiles, wherein a value of each tile in the tile image is generated based on a predetermined size area in said binary image;
    a character area extraction procedure of extracting an area in said binary image, corresponding to an area in a circumscribed rectangle surrounding connected pixels having the same value in said tile image, as a character area;
    a determination procedure of determining whether or not said character area is an inverted image based on the binary image of said image;
    an inversion processing procedure of inverting black and white components of said binary image if it is determined at said determination procedure that said character area is an inverted image; and
    a direction detection procedure of recognizing a direction of characters included in said character area of the binary image inverted in said inversion processing procedure, and thereby detecting the direction of said image.

* * * * *

UNITED STATES PATENT AND TRADEMARK OFFICE
CERTIFICATE OF CORRECTION

PATENT NO. : 7,317,835 B2
APPLICATION NO. : 10/627644
DATED : January 8, 2008
INVENTOR(S) : Tomotoshi Kanatsu et al.

It is certified that error appears in the above-identified patent and that said Letters Patent is hereby corrected as shown below:

COLUMN 3:

Line 13, "an" (first occurrence) should be deleted.

COLUMN 8:

Line 11, "image compression unit 21331" should read --image compression unit 2131--;
Line 16, "control" should read --controls--; and
Line 17, "register access ring 217," should read --register access ring 2137,--.

COLUMN 10:

Line 51, "performed" should read --is performed--; and
Line 54, "a channel" should read --α channel--.

COLUMN 11:

Line 14, "small" should read --a small--.

COLUMN 12:

Line 2, "small" should read --a small--;
Line 3, "a channel" should read --α channel--;
Line 6, "a" should read --α--; and
Line 26, "hole histogram" should read --whole histogram--.

COLUMN 13:

Line 30, "a" should be deleted.

COLUMN 14:

Line 64, "above-describe" should read --above-described--; and
Line 66, "actual" should read --to actual--.

COLUMN 15:

Line 7, "ON" should read --On--; and
Line 27, "are" should read --is--.

UNITED STATES PATENT AND TRADEMARK OFFICE
CERTIFICATE OF CORRECTION

PATENT NO. : 7,317,835 B2
APPLICATION NO. : 10/627644
DATED : January 8, 2008
INVENTOR(S) : Tomotoshi Kanatsu et al.

It is certified that error appears in the above-identified patent and that said Letters Patent is hereby corrected as shown below:

<u>COLUMN 16</u>:

Line 5, "further" should read --further,--; and
Line 55, "tables" should read --table--.

<u>COLUMN 18</u>:

Line 5, "that" should read --than that--.

Signed and Sealed this

Sixteenth Day of September, 2008

JON W. DUDAS
*Director of the United States Patent and Trademark Office*